US012223357B2

(12) United States Patent
Harwood et al.

(10) Patent No.: US 12,223,357 B2
(45) Date of Patent: Feb. 11, 2025

(54) METHOD AND SYSTEM FOR PERFORMING PREDICTIVE COMPOSITIONS FOR COMPOSED INFORMATION HANDLING SYSTEMS USING TELEMETRY DATA

(71) Applicant: Dell Products L.P., Round Rock, TX (US)

(72) Inventors: John S. Harwood, Boston, MA (US); Elie Antoun Jreij, Pflugerville, TX (US); Susan Elizabeth Young, North Scituate, RI (US); Edward Henry, Jurupa Valley, CA (US); Robert Anthony Lincourt, Jr., Franklin, MA (US); Gaurav Chawla, Austin, TX (US); Douglas L. Farley, Round Rock, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 696 days.

(21) Appl. No.: 17/569,092

(22) Filed: Jan. 5, 2022

(65) Prior Publication Data

US 2023/0214263 A1 Jul. 6, 2023

(51) Int. Cl.
*G06F 9/50* (2006.01)
(52) U.S. Cl.
CPC .................... *G06F 9/5027* (2013.01)
(58) Field of Classification Search
None
See application file for complete search history.

(56) References Cited

U.S. PATENT DOCUMENTS 8,099,487 B1  1/2012  Smirnov
8,473,962 B2 * 6/2013  Hebert .................... H04L 67/02
                                                      717/120

(Continued)

FOREIGN PATENT DOCUMENTS

WO       2017210142 A1    12/2017

OTHER PUBLICATIONS

Wu et al.; "Resource Allocation Based On Workflow For Enhancing the Performance of Composite Service"; 2007 IEEE International Conference on Services Computing; (Wu_2007.pdf, pp. 1-8) (Year: 2007).*

(Continued)

*Primary Examiner* — Hiren P Patel
(74) *Attorney, Agent, or Firm* — Aly Z. Dossa; Chamberlain, Hrdlicka, White, Williams & Aughtry

(57) ABSTRACT

Techniques described herein relate to a method for managing composed information handling systems. The method includes obtaining, by a system control processor manager, a composition request for a composed information handling system to perform a workflow; in response to obtaining the composition request: identifying a composed system blueprint associated with the workflow; making a first determination that there are first predictive analytics associated with the composed system blueprint; in response to the first determination: identifying a composed infrastructure associated with the composed system blueprint capable of performing the workflow based on telemetry data and the first predictive analytics; instantiating a composed information handling system using the composed infrastructure to service the composition request; and setting up telemetry services for the composed information handling system using an at least one control resource set.

18 Claims, 12 Drawing Sheets

(56) References Cited

U.S. PATENT DOCUMENTS

| | | |
|---|---|---|
| 8,949,978 B1 | 2/2015 | Lin et al. |
| 8,966,582 B1 | 2/2015 | Ainslie |
| 9,191,392 B2 | 11/2015 | Niemel |
| 9,686,287 B2 | 6/2017 | Manton et al. |
| 9,734,325 B1 | 8/2017 | Neumann |
| 9,811,390 B1* | 11/2017 | Ma .......................... G06F 9/46 |
| 10,127,084 B2* | 11/2018 | Benari ...................... G06F 8/61 |
| 10,707,950 B2 | 7/2020 | Martinerie et al. |
| 10,970,123 B1 | 4/2021 | Luciano |
| 11,049,349 B2 | 6/2021 | Onischuk |
| 11,113,721 B2 | 9/2021 | George et al. |
| 11,140,170 B2 | 10/2021 | Barouch et al. |
| 11,182,810 B1 | 11/2021 | Pandey et al. |
| 11,184,236 B2* | 11/2021 | Guim Bernat ........ H04L 9/3213 |
| 11,232,369 B1 | 1/2022 | Li et al. |
| 11,245,538 B2* | 2/2022 | Doshi ................ H04L 63/1408 |
| 11,307,885 B1 | 4/2022 | Luciano |
| 11,320,541 B1 | 5/2022 | Cattaneo et al. |
| 11,444,955 B2 | 9/2022 | Bhandari et al. |
| 11,522,776 B1 | 12/2022 | Pai |
| 11,528,300 B2 | 12/2022 | Degioanni |
| 11,539,817 B1 | 12/2022 | Perez |
| 11,558,413 B2 | 1/2023 | Higgins et al. |
| 11,561,916 B2 | 1/2023 | Kamath et al. |
| 11,630,706 B2* | 4/2023 | Doshi ................... G06F 9/5005 718/104 |
| 11,658,918 B2* | 5/2023 | Vedam .................. H04L 43/10 370/235 |
| 11,728,979 B2* | 8/2023 | Harwood ............ G06F 11/3006 713/171 |
| 11,886,926 B1 | 1/2024 | Gadalin |
| 11,928,515 B2* | 3/2024 | Dawkins ............... G06F 9/5027 |
| 12,026,557 B2* | 7/2024 | Dawkins ............... G06F 9/5044 |
| 12,141,609 B2* | 11/2024 | Harwood ................ G06F 9/505 |
| 2004/0230764 A1 | 11/2004 | Merchant et al. |
| 2006/0089837 A1 | 4/2006 | Adar |
| 2010/0269109 A1 | 10/2010 | Cartales |
| 2011/0078242 A1 | 3/2011 | Davi et al. |
| 2011/0093471 A1 | 4/2011 | Brockway et al. |
| 2011/0106922 A1 | 5/2011 | Bouillet |
| 2014/0317224 A1 | 10/2014 | Resch et al. |
| 2015/0327068 A1 | 11/2015 | Hunt et al. |
| 2016/0005029 A1 | 1/2016 | Ivey et al. |
| 2016/0098297 A1 | 4/2016 | Yuyitung |
| 2016/0105512 A1 | 4/2016 | Richter et al. |
| 2016/0301742 A1 | 10/2016 | Lowery |
| 2016/0359872 A1 | 12/2016 | Yadav et al. |
| 2017/0031761 A1 | 2/2017 | Horan et al. |
| 2017/0093700 A1 | 3/2017 | Gilley |
| 2017/0230266 A1 | 8/2017 | Smola |
| 2017/0279690 A1 | 9/2017 | Tripathi et al. |
| 2017/0317945 A1 | 11/2017 | Guo |
| 2018/0024861 A1* | 1/2018 | Balle .................... G02B 6/3882 |
| 2018/0262407 A1 | 9/2018 | Biswas et al. |
| 2018/0276632 A1 | 9/2018 | Gandevia et al. |
| 2018/0285951 A1 | 10/2018 | Borovikov et al. |
| 2019/0065256 A1 | 2/2019 | Hamilton et al. |
| 2019/0281132 A1 | 9/2019 | Sethuraman et al. |
| 2020/0027093 A1 | 1/2020 | Volk |
| 2020/0082112 A1 | 3/2020 | Altshuler et al. |
| 2020/0136994 A1* | 4/2020 | Doshi ................. H04L 41/0894 |
| 2020/0141827 A1 | 5/2020 | Lindman |
| 2020/0201692 A1 | 6/2020 | Kachare et al. |
| 2020/0250163 A1 | 8/2020 | Kuimelis et al. |
| 2020/0310853 A1 | 10/2020 | Featonby |
| 2020/0348959 A1 | 11/2020 | Krasner et al. |
| 2021/0117249 A1* | 4/2021 | Doshi ................. H04L 67/1001 |
| 2021/0209600 A1 | 7/2021 | Fontana et al. |
| 2022/0058042 A1* | 2/2022 | Vanjare .................. H04L 41/40 |
| 2022/0070193 A1 | 3/2022 | Konda et al. |
| 2022/0283974 A1 | 9/2022 | Long |
| 2022/0334870 A1 | 10/2022 | Chen |
| 2023/0112101 A1 | 4/2023 | Nainar |

OTHER PUBLICATIONS

Wu et al.; "Workflow-based resource allocation to optimize overall performance of composite services"; Future Generation Computer Systems 25 (2009) 199-212; (Wu_2009.pdf; pp. 1-14) (Year: 2009).*

Wiswanathan et al.; "Predictive Provisioning: Efficiently Anticipating Usage in Azure SQL Database"; 2017 IEEE 33rd International Conference on Data Engineering; DOI 10.1109/ICDE.2017.155; (Wiswanathan_2017.pdf; pp. 1111-1116) (Year: 2017).*

Anonymous: "In-situ processing—Wikipedia", Oct. 23, 2021 (2021-10023), pp. 1-4, XP093027589, Retrieved from the Internet: URL: https://en.wikipedia.org/w/index.php?title=In-situ_processing &oldid=1051487646 [retrieved on Feb. 28, 2023] (4 pages).

International Search Report and Written Opinion mailed Apr. 11, 2023, issued in corresponding PCT Application No. PCT/US2022/053142 (11 pages).

International Search Report and Written Opinion mailed Apr. 12, 2023, issued in corresponding PCT Application No. PCT/US2022/053170 (13 pages).

International Search Report and Written Opinion mailed Apr. 18, 2023, issued in corresponding PCT Application No. PCT/US2022/053169 (10 pages).

International Search Report and Written Opinion mailed Mar. 9, 2023, issued in corresponding PCT Application No. PCT/US2022/053157 (14 pages).

Shaikh Aaysha et al., "Framework for Security of Shared Data in Cloud Environment", 2016 International Conference on Computing Communication Control and Automation (ICCUBEA), IEEE, Aug. 12, 2016, pp. 1-6 (6 pages).

\* cited by examiner

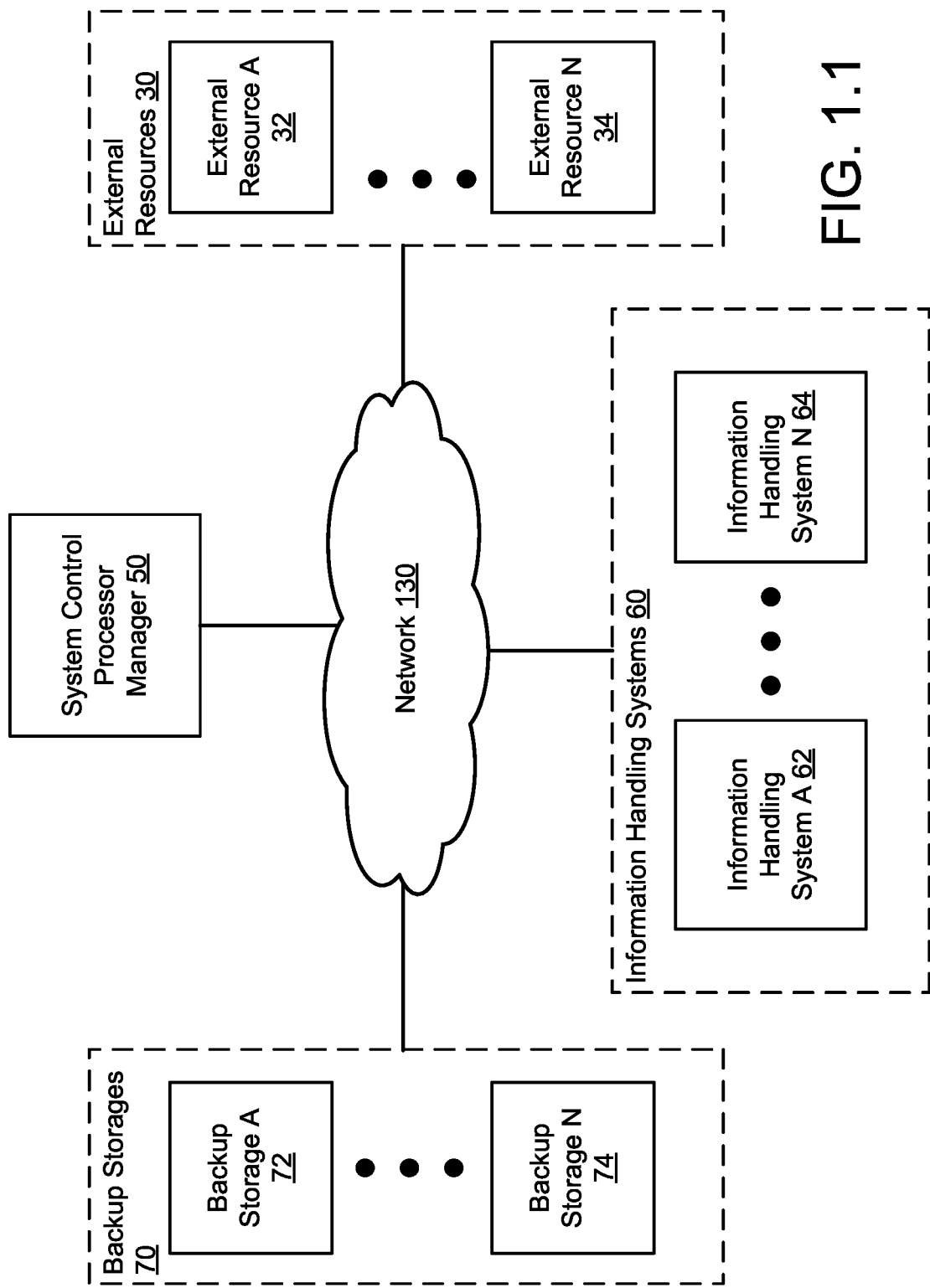
FIG. 1.1

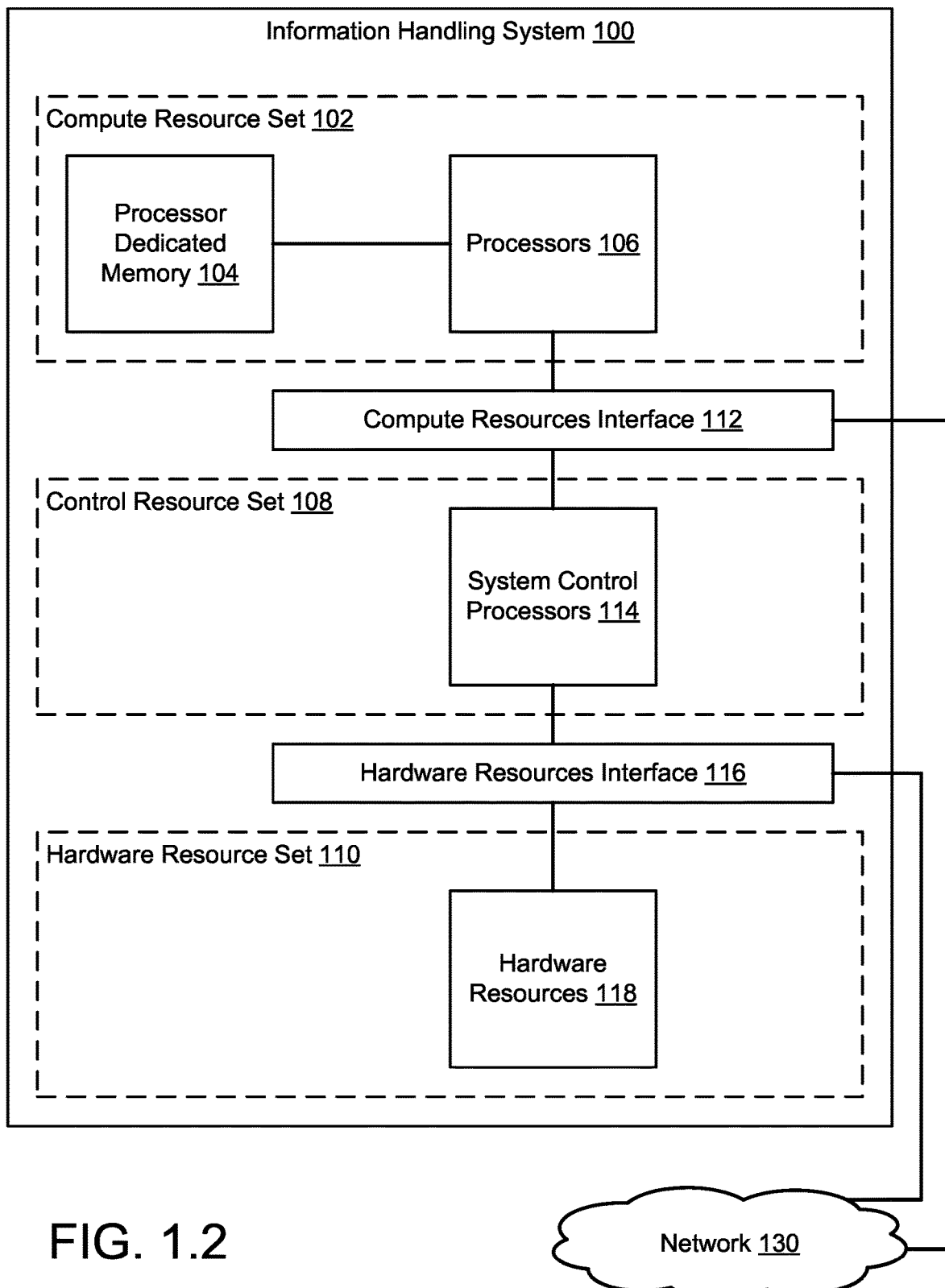
FIG. 1.2

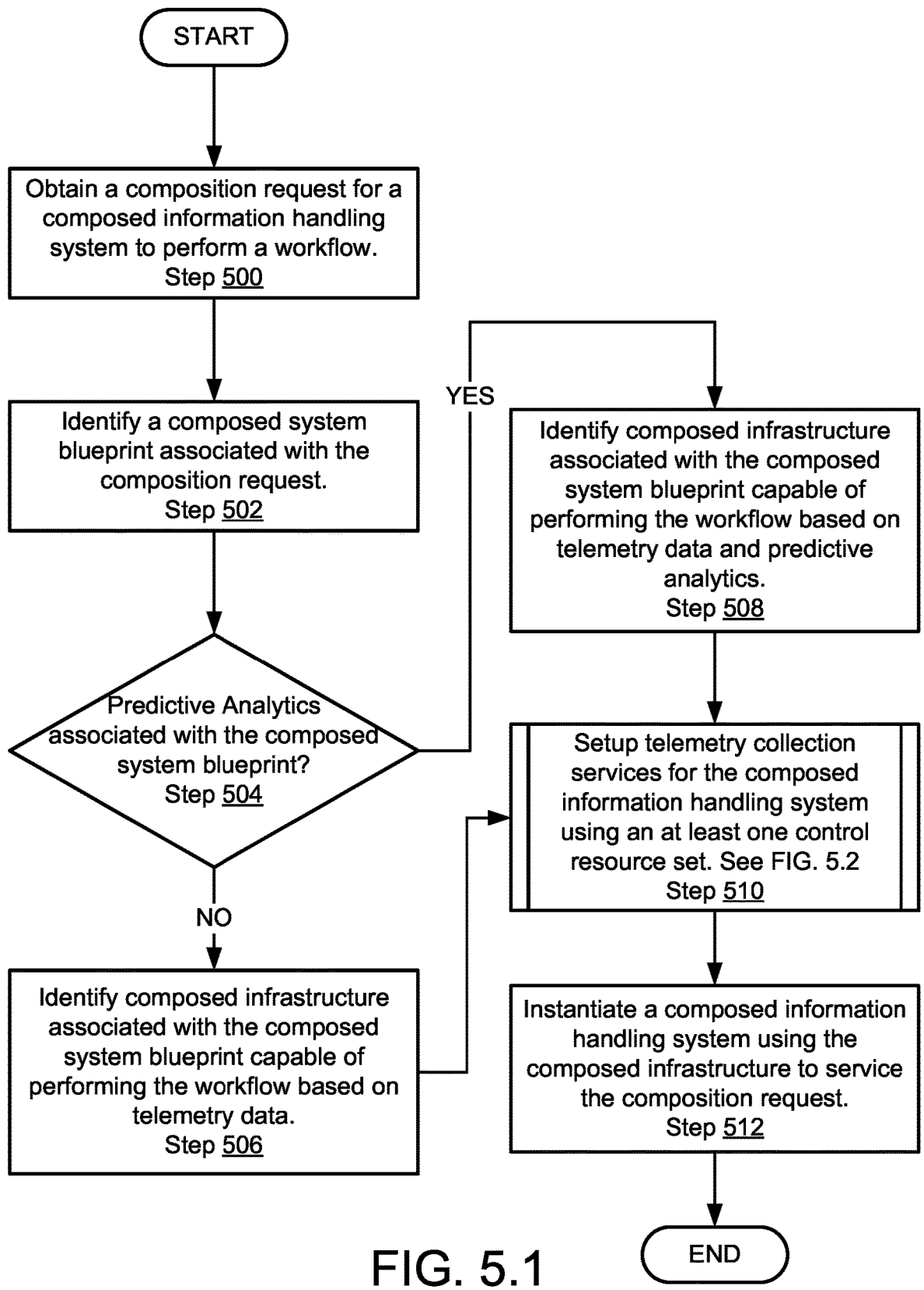
FIG. 5.1

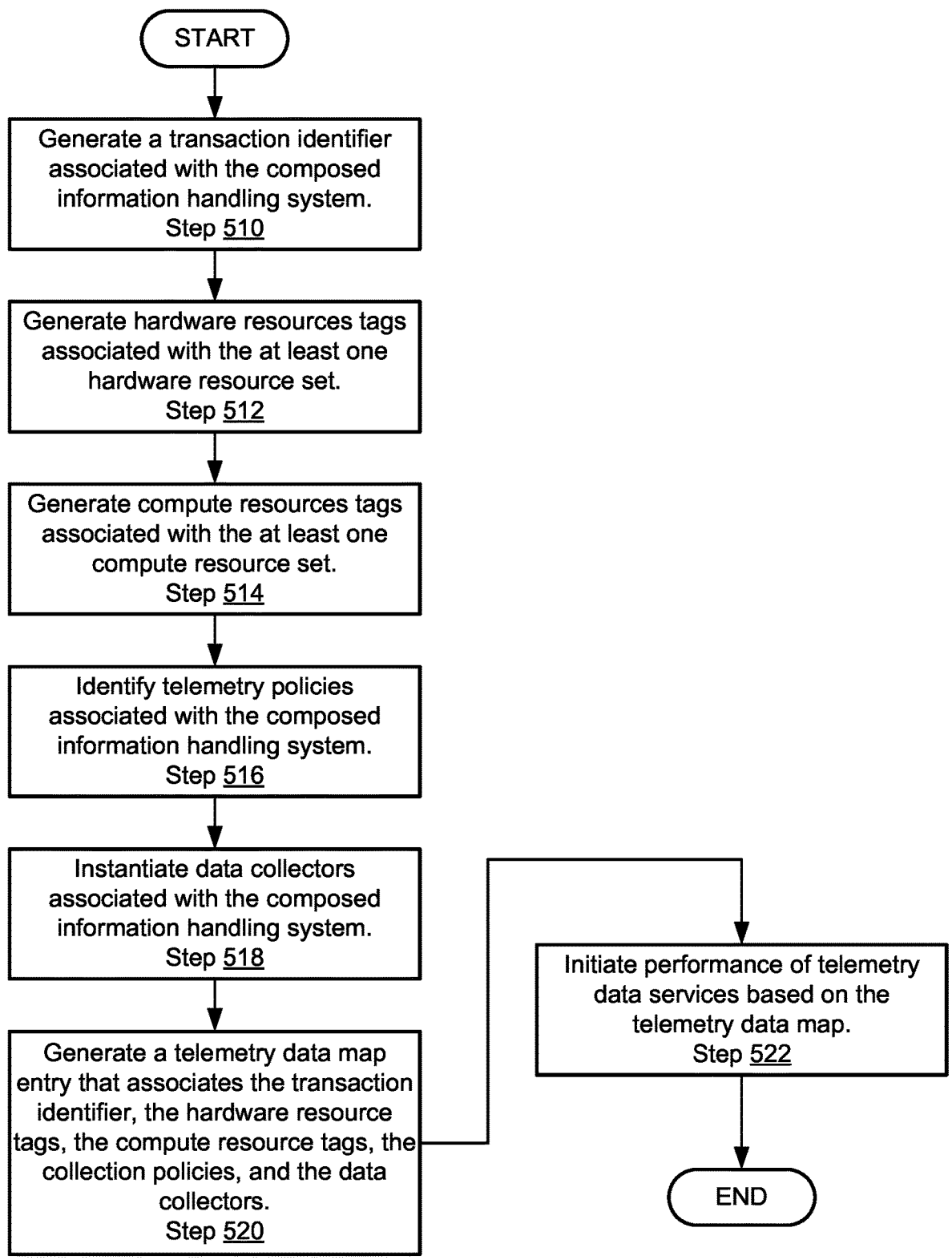
FIG. 5.2

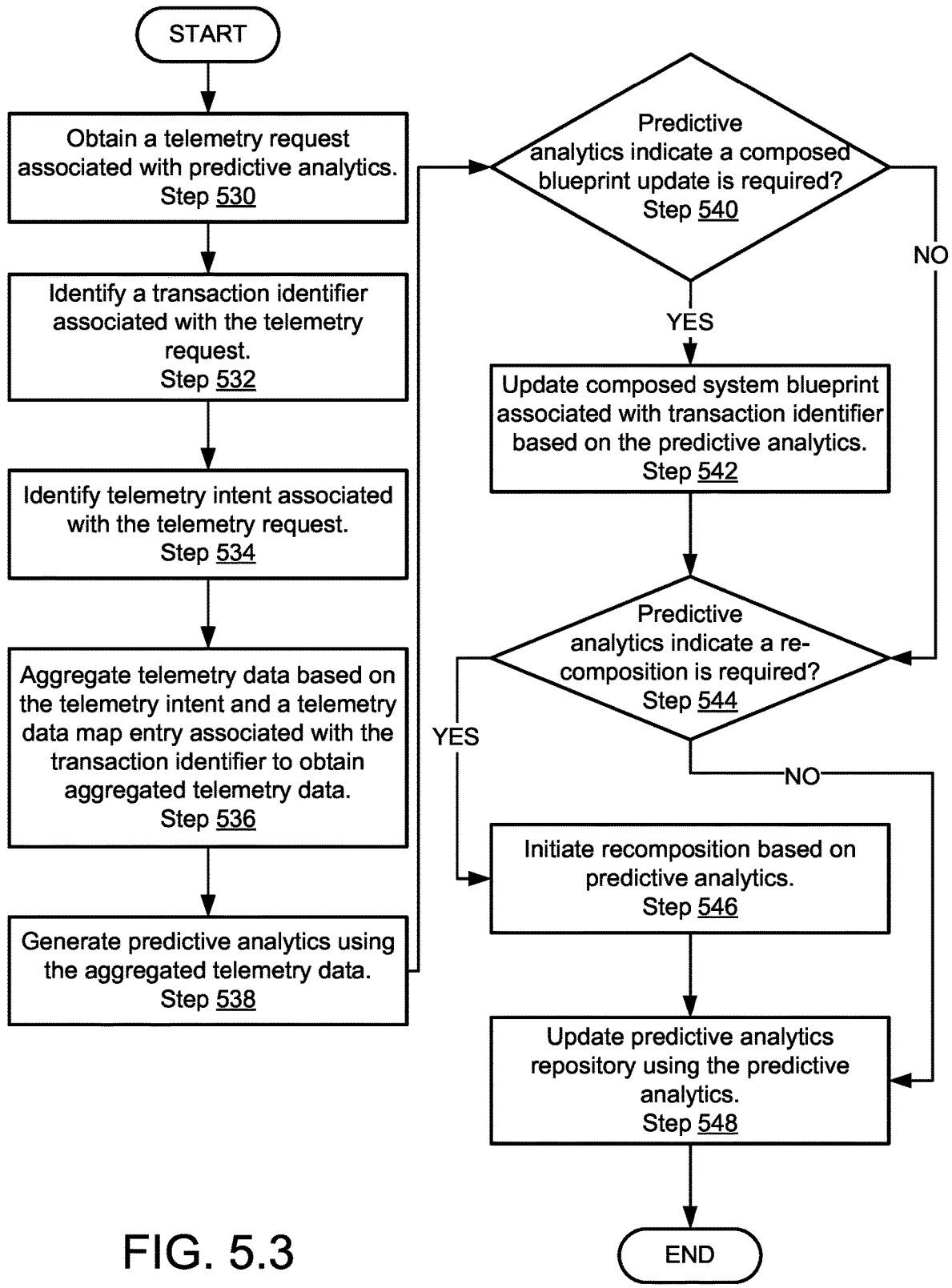
FIG. 5.3

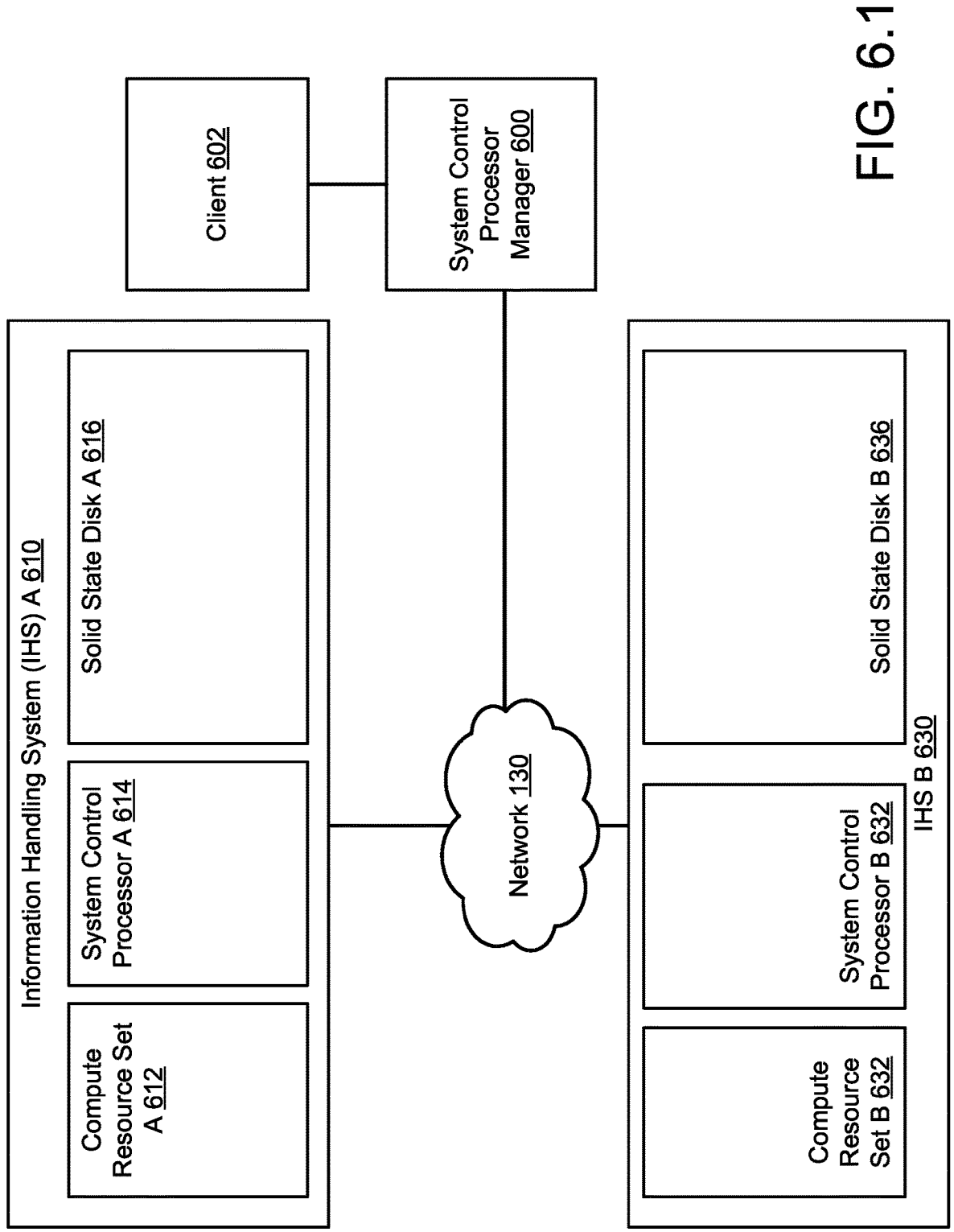
FIG. 6.1

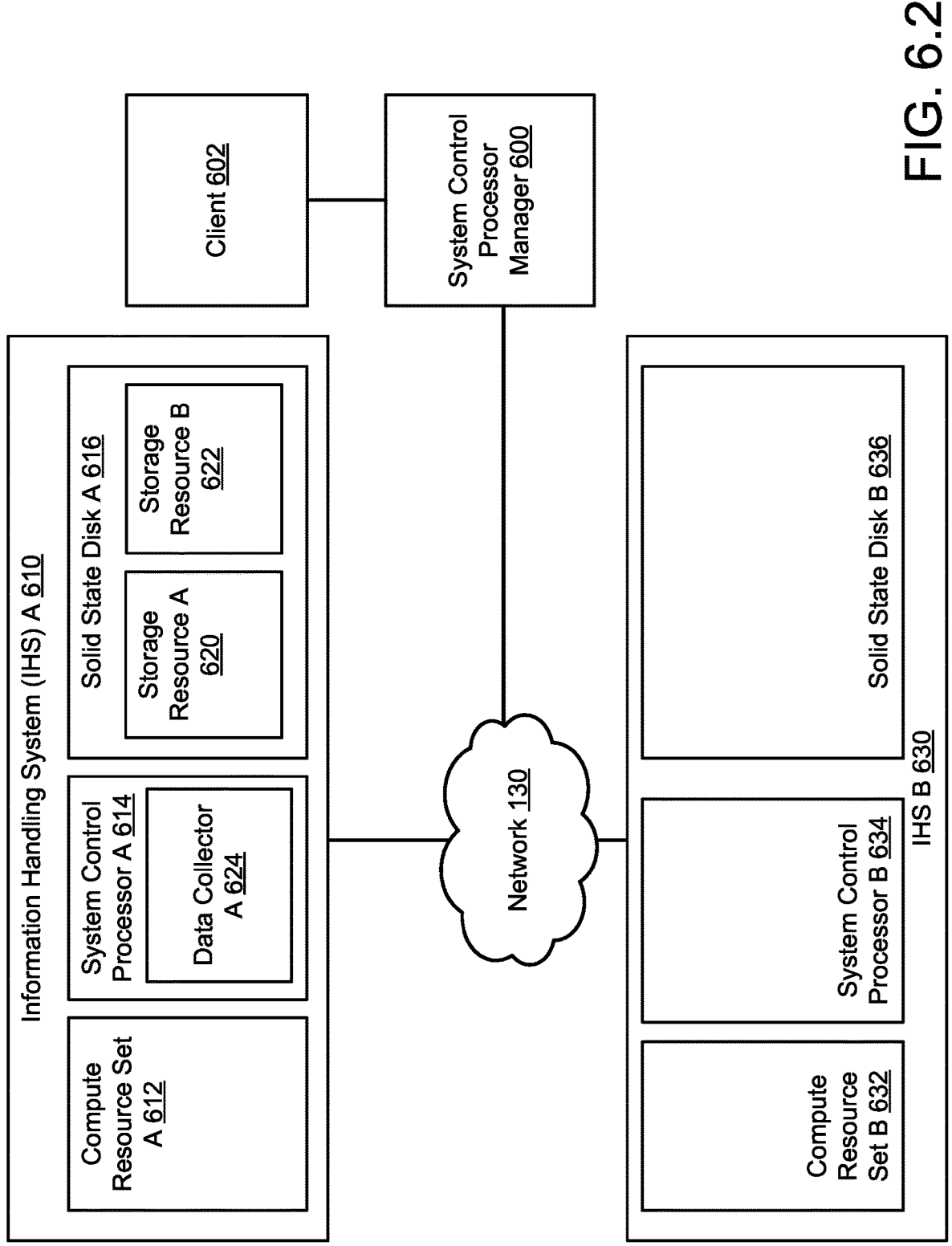
FIG. 6.2

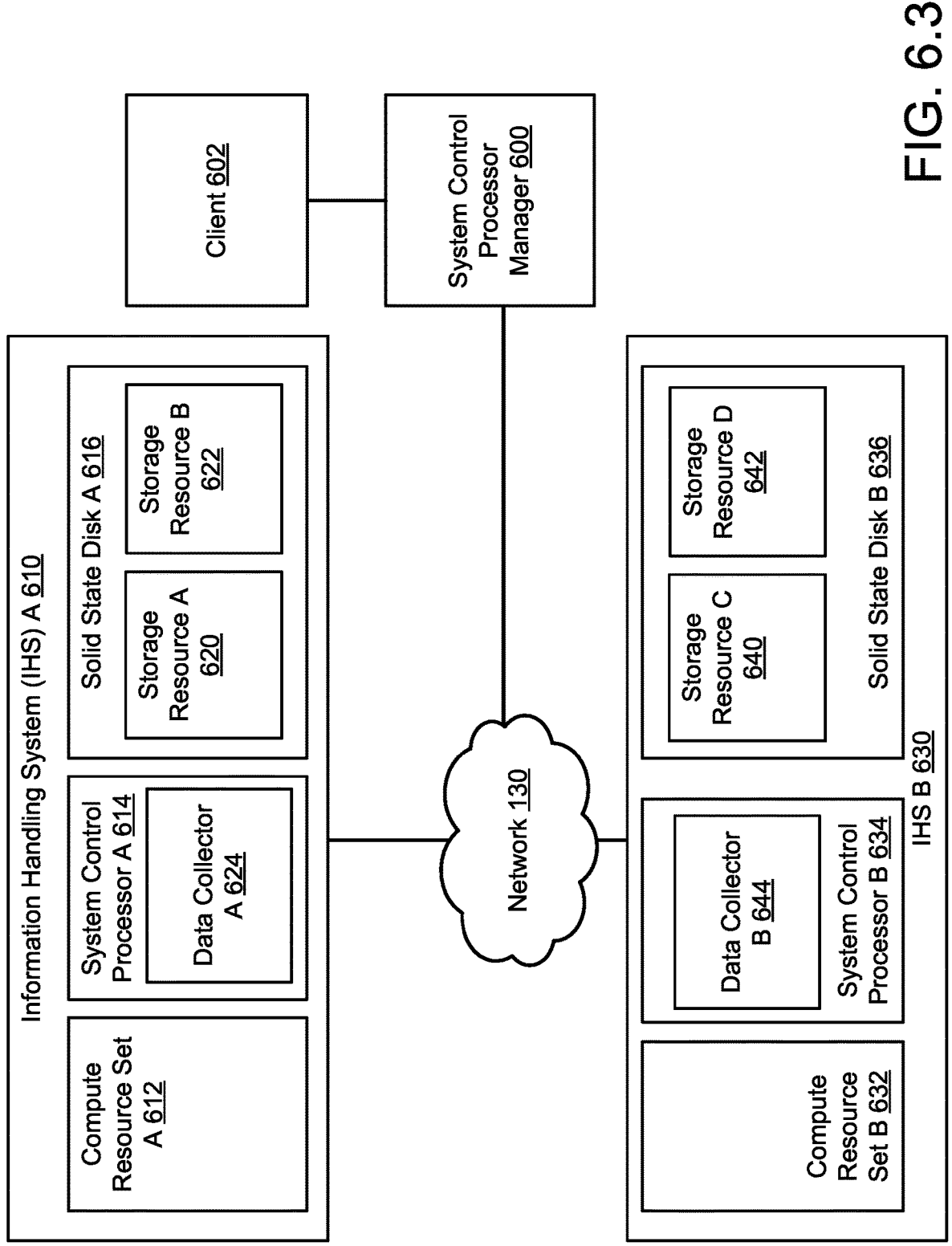
FIG. 6.3

METHOD AND SYSTEM FOR PERFORMING PREDICTIVE COMPOSITIONS FOR COMPOSED INFORMATION HANDLING SYSTEMS USING TELEMETRY DATA

BACKGROUND

Computing devices may provide services. To provide the services, the computing devices may include hardware components and software components. The services provided by the computing devices may be limited by these components. The hardware components and software components may be allocated to provide the services. The state of the allocations may be important for users and/or the protection of the computing devices. To analyze the state of the allocations, telemetry data associated with the hardware and software components may be generated. The telemetry data may further be used to efficiently perform the allocations.

SUMMARY

In general, certain embodiments described herein relate to a method for managing composed information handling systems. The method may include obtaining, by a system control processor manager, a composition request for a composed information handling system to perform a workflow; in response to obtaining the composition request: identifying a composed system blueprint associated with the workflow; making a first determination that there are first predictive analytics associated with the composed system blueprint; in response to the first determination: identifying a composed infrastructure associated with the composed system blueprint capable of performing the workflow based on telemetry data and the first predictive analytics; instantiating a composed information handling system using the composed infrastructure to service the composition request; and setting up telemetry services for the composed information handling system using an at least one control resource set.

In general, certain embodiments described herein relate to a system for managing composed information handling systems. The system includes a plurality of information handling systems which include a plurality of system control processors. The system also includes a system control processor manager, which includes a processor and memory, and is programmed to obtain a composition request for a composed information handling system to perform a workflow; in response to obtaining the composition request: identify a composed system blueprint associated with the workflow; make a first determination that there are first predictive analytics associated with the composed system blueprint; in response to the first determination: identify a composed infrastructure associated with the composed system blueprint capable of performing the workflow based on telemetry data and the first predictive analytics; instantiate a composed information handling system using the composed infrastructure to service the composition request; and set up telemetry services for the composed information handling system using an at least one control resource set.

In general, certain embodiments described herein relate to a non-transitory computer readable medium that includes computer readable program code, which when executed by a computer processor enables the computer processor to perform a method for managing composed information handling systems. The method may include obtaining, by a system control processor manager, a composition request for a composed information handling system to perform a workflow; in response to obtaining the composition request: identifying a composed system blueprint associated with the workflow; making a first determination that there are first predictive analytics associated with the composed system blueprint; in response to the first determination: identifying a composed infrastructure associated with the composed system blueprint capable of performing the workflow based on telemetry data and the first predictive analytics; instantiating a composed information handling system using the composed infrastructure to service the composition request; and setting up telemetry services for the composed information handling system using an at least one control resource set.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments of the invention.

FIG. 1.2 shows a diagram of an information handling system in accordance with one or more embodiments of the invention.

FIG. 5.1 shows a flowchart of a method for instantiating a composed information handling system in accordance with one or more embodiments of the invention.

FIGS. 5.2 shows a flowchart of a method for setting up telemetry services in accordance with one or more embodiments of the invention.

FIG. 5.3 shows a flowchart of a method for performing telemetry services in accordance with one or more embodiments of the invention.

FIGS. 6.1-6.3 show diagrams of the operation of an example system over time in accordance with one or more embodiments of the invention.

DETAILED DESCRIPTION

Figure 2:
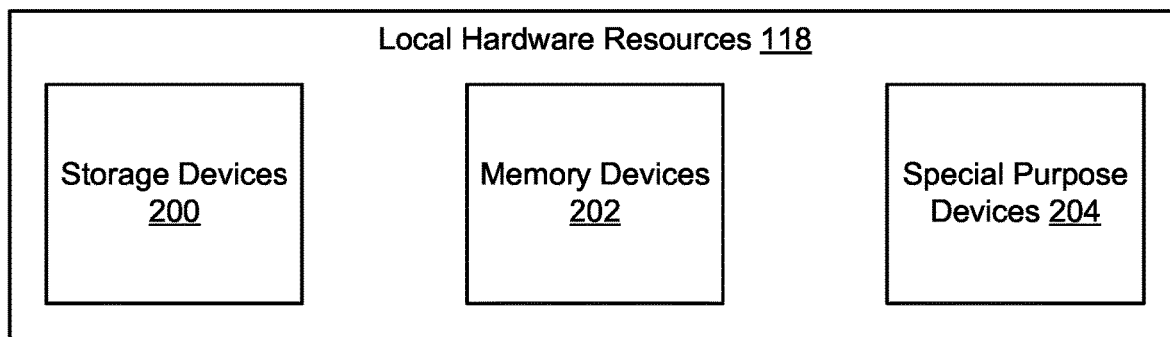
FIG. 2 shows a diagram of local hardware resources in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general embodiments of the invention relate to methods, systems, and non-transitory computer readable mediums for performing telemetry services for composed information handling systems.

In one or more embodiments of the invention, composed information handling system are composed to perform computer implemented services. A composed information handling system may be a device (the components of which may be distributed across one or more information handling systems) that has exclusive use over a quantity of computing resources. Computing resources from multiple information handling systems may be allocated to a composed information handling system thereby enabling a composed information handling system to utilize computing resources from any number of information handling system for performance of corresponding computer implemented services.

To allocate computing resources, the system may include a system control processor manager. The system control processor manager may obtain composition requests. The composition requests may indicate a desired outcome such as, for example, execution of one or more applications, providing of one or more services, etc. The system control processor manager may translate the composition requests into corresponding quantities of computing resources necessary to be allocated to satisfy the intent of the composition requests.

The users of composed information handling systems may desire to evaluate the health and performance of the computing resources of composed information handling systems. Telemetry data may be generated for composed information handling systems satisfy the aforementioned desire to evaluate the health and performance of the computing resources of composed information handling systems. Due to the large scale of composed information handling systems, a massive quantity of telemetry data may be generated for a single composition handling system. In traditional systems, all of the telemetry data may be provided to a user, and the user may have to manually parse the telemetry data to identify a portion of the telemetry data that the user desires to evaluate. This may take a significant amount of the user's time. Additionally, telemetry data may be leveraged to optimize the composition of composed information handling systems. Furthermore, it may be difficult to maintain the physical to logical component mappings included in the composed information handling system and the telemetry data associated with the aforementioned mappings. Moreover, there may be risks of data security breaches if the unauthorized users gained access to the telemetry data.

To address, at least in part, the aforementioned issues, embodiments of the invention relate to providing telemetry services for composed information handling systems. Specifically, embodiments of the invention may enable users associated with a group to submit composition requests associated with telemetry services, provide a system control processor manager that may compose an compose information handling system to with telemetry service using telemetry data and predictive analytics to optimize the composition of composed information handling system. As a result, a user of the composed information handling system may submit a telemetry request associated with predictive analytics to the system control processor manager. The system control processor manager may aggregate telemetry data from data collectors and/or system control processors of the composed information handling system to generate predictive analytics to satisfy the telemetry intent. Consequently, the telemetry data and the predictive analytics may be used to update composed system blueprints and improve the composition of future composed information handling systems as well as dynamically re-compose composed information handling systems based on future predicted issues using the predictive analytics.

Thus, embodiments of the invention may address the problem of the inefficient use of composed information handling systems to perform telemetry services. The composed information handling systems may leverage telemetry data maps to generate, track and maintain telemetry data that may be used to generate predictive analytics. Therefore, the telemetry data and the predictive analytics may enable the system control processor manager to optimize the composition of composed information handling systems based on past states, current states, and/or futures states of similar composed information handling systems FIG. 1.1 shows a system in accordance with one or more embodiments of the invention. The system may include any number of information handling systems (60). The information handling systems (60) may provide computer implemented services. The computer implemented services may include, for example, database services, data storage services, electronic communications services, data protection services, and/or other types of services that may be implemented using information handling systems.

The information handling system of the system of FIG. 1.1 may operate independently and/or cooperatively to provide the computer implemented services. For example, a single information handling system (e.g., 60) may provide a computer implemented service on its own (i.e., independently) while multiple other information handling systems (e.g., 62, 64) may provide a second computer implemented service cooperatively (e.g., each of the multiple other information handling systems may provide similar and or different services that form the cooperatively provided service).

To provide computer implemented services, the information handling systems (60) may utilize computing resources provided by hardware devices. The computing resources may include, for example, processing resources, storage resources, memory resources, graphics processing resources, communications resources, and/or other types of resources provided by the hardware devices. Various hardware devices may provide these computing resources.

As discussed above, embodiments of the invention relate to system, methods, and devices for managing the hardware resources of the information handling systems (60) and/or other resources (e.g., external resources (30)) to perform telemetry services for composed information handling systems and the information handling systems (60). The hardware resources of the information handling systems (60) may be managed by instantiating one or more composed information handling systems using the hardware resources of the information handling systems (60), external resources (30), and/or other types of hardware devices operatively connected to the information handling systems (60). During the instantiation of the composed information handling systems, one or more devices, including a system control processor and data collectors, may be automatically setup to perform telemetry services for the composed information handling systems. The telemetry services may be used to collect telemetry data and provide the telemetry data to users.

In one or more embodiments of the invention, the system includes a system control processor manager (50). The system control processor manager (50) may provide composed information handling system composition services. Composed information handling system composition services may include (i) obtaining composition requests for composed information handling systems and (ii) aggregating computing resources from the information handling systems (60) and/or external resources (30) using system control processors to service the composition requests by instantiating composed information handling systems in accordance with the requests. By doing so, instantiated composed information handling systems may provide computer implemented services in accordance with the composition requests.

In one or more embodiments of the invention, the system control processor manager (50) instantiates composed information handling systems in accordance with a three resource set model. As will be discussed in greater detail below, the computing resources of an information handling system may be divided into three logical resource sets: a compute resource set, a control resource set, and a hardware resource set. Different resource sets, or portions thereof, from the same or different information handling systems may be aggregated (e.g., caused to operate as a computing device) to instantiate a composed information handling system having at least one resource set from each set of the three resource set model.

By logically dividing the computing resources of an information handling system into these resource sets, different quantities an types of computing resources may be allocated to each composed information handling system thereby enabling the resources allocated to the respective information handling system to match performed workloads. Further, dividing the computing resources in accordance with the three set model may enable different resource sets to be differentiated (e.g., given different personalities) to provide different functionalities. Consequently, composed information handling systems may be composed on the basis of desired functionalities rather than just on the basis of aggregate resources to be included in the composed information handling system.

Additionally, by composing composed information handling systems in this manner, the control resource set of each composed information handling system may be used to consistently deploy management services across any number of composed information handling systems. Consequently, embodiments of the invention may provide a framework for unified security, manageability, resource management/composability, workload management, and distributed system management by use of this three resource set model. For additional details regarding the system control processor manager (50), refer to FIG. 4.

In one or more embodiments of the invention, a composed information handling system (also referred to herein as a composed system) is a device that is formed using all, or a portion, of the computing resources of the information handling systems (60), the external resources (30), and/or other types of hardware devices operatively connected to the information handling systems (60). The composed information handling system may utilize the computing resources allocated to it to provide computer implemented services. For example, the composed information handling system may host one or more applications that utilize the computing resources assigned to the composed information handling system. The applications may provide the computer implemented services.

To instantiate composed information handling systems, the information handling systems (60) may include at least three resource sets including a control resource set. The control resource set may include a system control processor. The system control processor of each information handling system may coordinate with the system control processor manager (50) to enable composed information handling systems to be instantiated. For example, the system control processor of an information handling system may provide telemetry data regarding the computing resources of an information handling system, may perform actions on behalf of the system control processor manager (50) to aggregate computing resources together, may organize the performance of duplicative workloads to improve the likelihood that workloads are completed, and/or may provide services that unify the operation of composed information handling systems.

In one or more embodiments of the invention, compute resource sets of composed information handling systems are presented with bare metal resources by control resource sets even when the presented resources are actually being managed using one or more layers of abstraction, emulation, virtualization, security model, etc. For example, the system control processors of the control resource sets may provide the abstraction, emulation, virtualization, data protection, and/or other services while presenting the resources as bare metal resources. Consequently, these services may be transparent to applications hosted by the compute resource sets of composed information handling systems thereby enabling uniform deployment of such services without requiring implementation of control plane entities hosted by the compute resource sets of the composed information handling systems. For additional details regarding the information handling systems (60), refer to FIG. 1.2.

The external resources (30) may be provide computing resources that may be allocated for use by composed information handling systems. For example, the external resources (30) may include hardware devices that provide any number and type of computing resources. The composed information handling system may use these resource to provide their functionalities. Different external resources (e.g., 32, 34) may provide similar or different computing resources.

In one or more embodiments of the invention, the system of FIG. 1.1 includes backup storages (70) that provide data storage services to the composed information handling systems. The backup storages (70) may include any number of backup storages, for example, the backup storages (70) may include backup storage A (72) and backup storage N (74). The data storage services may include storing of data provided by the composed information handling systems and providing previously stored data to the composed information handling systems. The data stored in backup storages (70) may be used for restoration purposes. The data stored in the backup storages (70) may be used for other purposes without departing from the invention. The data stored in backup storages (70) may include backups generated during the performance of data protection services of the composed information handling systems. The backups may be any type of backup (e.g., snapshot, incremental backup, full backup, etc.) without departing from the invention. The data stored in backup storages (70) may include other and/or additional types of data obtained from other and/or additional components without departing from the invention.

The system of FIG. 1.1 may include any number of information handling systems (e.g., 62, 64), any number of external resources (e.g., 32, 34), any number of backup storages (e.g., 72, 74), and any number of system control processor managers (e.g., 50). Any of the components of FIG. 1.1 may be operatively connected to any other component and/or other components not illustrated in FIG. 1.1 via one or more networks (e.g., 130). The networks may be implemented using any combination of wired and/or wireless network topologies.

The system control processor manager (50), information handling systems (60), backup storages (70), and/or external resources (30) may be implemented using computing devices. The computing devices may include, for example, a server, laptop computer, a desktop computer, a node of a distributed system, etc. The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the system control processor manager (50), information handling systems (60), backup storages (70), and/or external resources (30) described in this application and/or all, or a portion of, the methods illustrated in FIGS. 5.1-5.3. The system control processor manager (50), information handling systems (60), backup storages (70), and/or external resources (30) may be implemented using other types of computing devices without departing from the invention. For additional details regarding computing devices, refer to FIG. 7.

While the system has been illustrated and described as including a limited number of specific components, a system in accordance with embodiments of the invention may include additional, fewer, and/or different components without departing from the invention.

Turning to FIG. 1.2, FIG. 1.2 shows a diagram of an information handling system (100) in accordance with one or more embodiments of the invention. Any of the information handling systems (e.g., 60) of FIG. 1.1 may be similar to the information handling system (100) illustrated in FIG. 1.2.

As discussed above, the information handling system (100) may provide any quantity and type of computer implemented services. To provide the computer implemented services, resources of the information handling system may be used to instantiate one or more composed information handling systems. The composed information handling systems may provide the computer implemented services.

To provide computer implemented services, the information handling system (100) may include any number and type of hardware devices including, for example, one or more processors (106), any quantity and type of processor dedicated memory (104), one or more system control processors (114), and any number of hardware resources (118). These hardware devices may be logically divided into three resource sets including a compute resource set (102), a control resource set (108), and a hardware resource set (110).

The control resource set (108) of the information handling system (100) may facilitate formation of composed information handling systems and perform telemetry services. To do so, the control resource set (108) may prepare any quantity of resources from any number of hardware resource sets (e.g., 110) (e.g., of the information handling system (100) and/or other information handling systems) for presentation to processing resources of any number of computing resource sets (e.g., 102) (e.g., of the information handling system (100) and/or other information handling systems). Once prepared, the control resource set (108) may present the prepared resources as bare metal resources to the processors (e.g., 106) of the allocated computing resources. By doing so, a composed information handling system may be instantiated. Additionally, the control resource set (108) may prepare hardware resource sets (e.g., 110) or other computer resources (e.g., system control processors (114)) to perform all, or a portion of, the telemetry services.

To prepare the resources of the hardware resource sets for presentation, the control resource set (108) may employ, for example, virtualization, indirection, abstraction, and/or emulation. These management functionalities may be transparent to applications hosted by the resulting instantiated composed information handling systems. Consequently, while unknown to the control plane entities of the composed information handling system, the composed information handling system may operate in accordance with any number of management models thereby providing for unified control and management of composed information handling systems. These functionalities may be transparent to applications hosted by composed information handling systems thereby relieving them from overhead associated with these functionalities.

For example, consider a scenario where a compute resource set is instructed to instantiate a composed information handling system including a compute resource set and a hardware resource set that will contribute storage resources to the compute resource set. The compute resource set may virtualize the storage resources of the hardware resource set to enable a select quantity of the storage resources to be allocated to the composed information handling system while reserving some of the storage resources for allocation to other composed information handling systems. However, the prepared storage resources may be presented to the compute resource set as bare metal resources. Consequently, the compute resource set may not need to host any control plane entities or otherwise incur overhead for utilizing the virtualized storage resources.

The compute resource set (102) may include one or more processors (106) operatively connected to the processor dedicated memory (104). Consequently, the compute resource set (102) may host any number of executing processes thereby enabling any number and type of workloads to be performed. When performing the workloads, the compute resource set (102) may utilize computing resources provided by the hardware resource set (110) of the information handling system (100), hardware resource sets of other information handling systems, and/or external resources.

The processors (106) of the compute resource set (102) may be operatively connected to one or more system control processors (114) of the control resource set (108). For example, the processors (106) may be connected to a compute resource interface (112), which is also connected to the system control processors (114).

The system control processors (114) of the control resource set (108) may present computing resources to the processors (106) as bare metal resources. In other words, from the point of view of the processors (106), any number of bare metal resources may be operatively connected to it via the compute resources interface (112) when, in reality, the system control processors (114) are operatively connected to the processors (106) via the compute resources interface (112). In other words, the system control processors (114) may manage presentation of other types of resources to the compute resource set (102).

By presenting the computing resources to the processors as bare metal resources, control plane entities (e.g., applications) such as hypervisors, emulators, and/or other types of management entities may not need to be hosted (e.g., executed) by the processors (106) for the processors (106) and entities hosted by them to utilize the computing resources allocated to a composed information handling system. Accordingly, all of the processing resources provided by the compute resource set (102) may be dedicated to providing the computer implemented services.

For example, the processors (106) may utilize mapped memory addresses to communicate with the bare metal resources presented by the system control processors (114) to the processors (106). The system control processors (114) may obtain these communications and appropriately remap (e.g., repackage, redirect, encapsulate, etc.) the communications to the actual hardware devices providing the computing resources, which the processors (106) are interacting with via the compute resources interface (112) and/or hardware resources interface (116), discussed below. Consequently, indirection, remapping, and/or other functions required for resource virtualization, emulation, abstraction, or other methods of resource allocation (other than bare metal) and manage may not need to be implemented via the processors (106).

By doing so, any number of functions for a composed information handling system may be automatically performed in a manner that is transparent to the control plane. Accordingly, a composed information handling system may operate in a manner consistent with a unified, consistent architecture or model (e.g., communications model, data storage model, etc.) by configuring the operation of one or more system control processors in a manner consistent with the architecture or model.

In one or more embodiments of the invention, control plane entities utilize computing resources presented through one or more layers of indirection, abstraction, virtualization, etc. In other words, an indirect user of hardware devices and computing resources provided thereby.

In one or more embodiments of the invention, data plane entities directly utilize computing resources. For example, data plane entities may instruct hardware devices on their operation thereby directly utilizing computing resources provided thereby. Data plane entities may present the computing resources to control plane entities using one or more layers of indirection, abstraction, virtualization, etc.

The system control processors (114) may present any number of resources operatively connected to it (e.g., the hardware resource set (110), other resources operatively connected to it via an interface (e.g., hardware resources interface (116), etc.) as bare metal resources to the processors (106) of the compute resource set (102). Consequently, the system control processors (114) may implement device discovery processes compatible with the processors (106) to enable the processors (106) to utilize the presented computing resources.

For example, the hardware resource set (110) may include hardware resources (118) operatively connected to the system control processors (114) via a hardware resources interface (116). The hardware resources (118) may include any number and type of hardware devices that provide computing resources. For additional details regarding the hardware resources (118), refer to FIG. 2.

In another example, the system control processors (114) may be operatively connected to other hardware resource sets of other information handling systems via hardware resources interface (116), network (130), and/or other system control processors of the other information handling systems. The system control processors (114) may cooperatively enable hardware resource sets of other information handling systems to be prepared and presented as bare metal resources to the compute resource set (102).

In an additional example, the system control processors (114) may be operatively connected to external resources via hardware resources interface (116) and network (130). The system control processors (114) may prepare and present the external resources as bare metal resources to the compute resource set (102).

Figure 3:
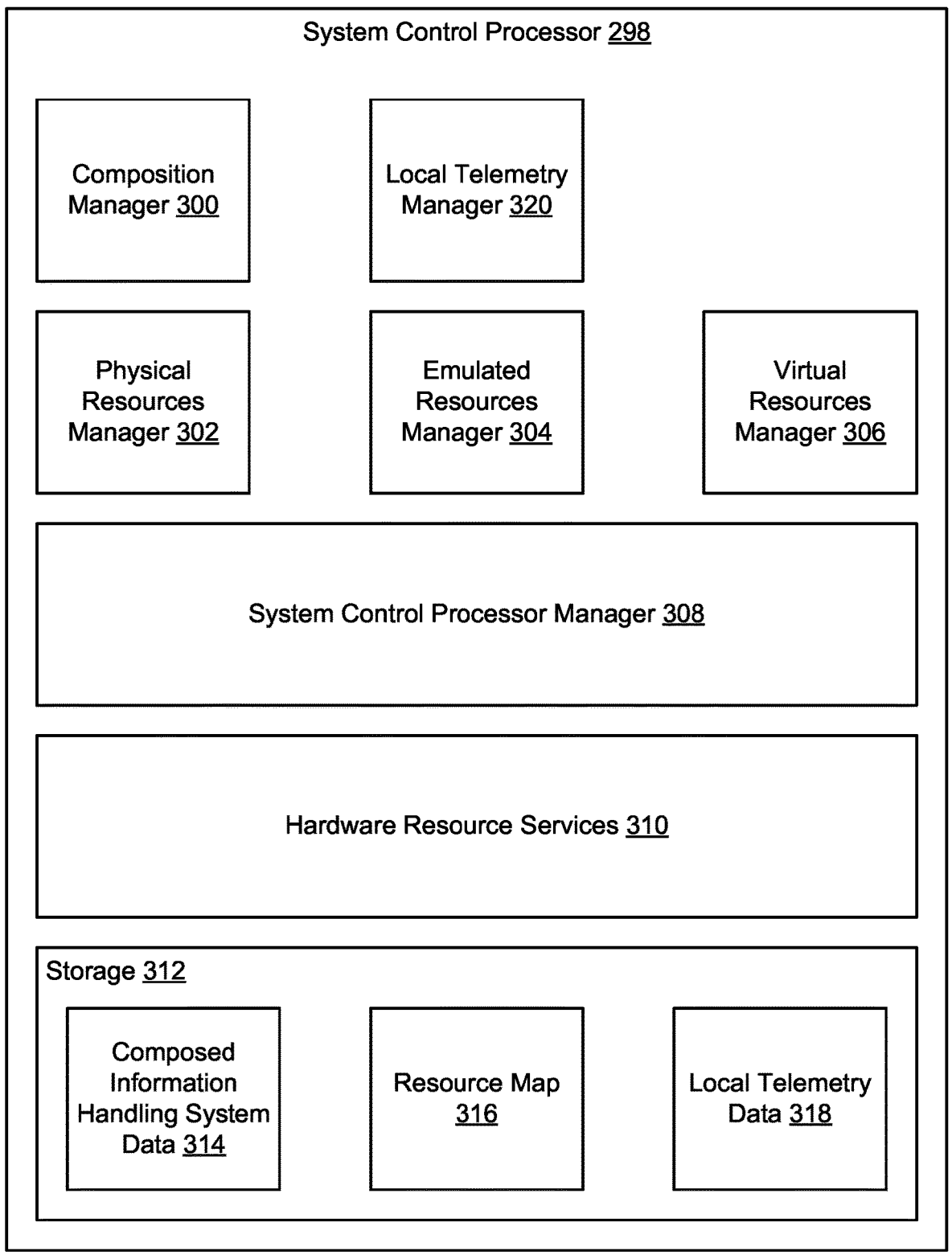
FIG. 3 shows a diagram of a system control processor in accordance with one or more embodiments of the invention.

For additional details regarding the operation and functions of the system control processors (114), refer to FIG. 3.

The compute resources interface (112) may be implemented using any suitable interconnection technology including, for example, system buses such as compute express links or other interconnection protocols. The compute resources interface (112) may support any input/output (IO) protocol, any memory protocol, any coherence interface, etc. The compute resources interface (112) may support processor to device connections, processor to memory connections, and/or other types of connections. The compute resources interface (112) may be implemented using one or more hardware devices including circuitry adapted to provide the functionality of the compute resources interface (112).

The hardware resources interface (116) may be implemented using any suitable interconnection technology including, for example, system buses such as compute express links or other interconnection protocols. The hardware resources interface (116) may support any input/output (IO) protocol, any memory protocol, any coherence interface, etc. The hardware resources interface (116) may support processor to device connections, processor to memory connections, and/or other types of connections. The hardware resources interface (116) may be implemented using one or more hardware devices including circuitry adapted to provide the functionality of the hardware resources interface (116).

In some embodiments of the invention, the compute resource set (102), control resource set (108), and/or hardware resource set (110) may be implemented as separate physical devices. In such a scenario, the compute resources interface (112) and hardware resources interface (116) may include one or more networks enabling these resource sets to communicate with one another. Consequently, any of these resource sets (e.g., 102, 108, 110) may include network interface cards or other devices to enable the hardware devices of the respective resource sets to communicate with each other.

In one or more embodiments of the invention, the system control processors (114) support multiple, independent connections. For example, the system control processors (114) may support a first network communications connection (e.g., an in-band connection) that may be allocated for use by applications hosted by the processors (106). The system control processors (114) may also support a second network communications connection (e.g., an out-of-band connection) that may be allocated for use by applications hosted by the system control processors (114). The out-of-ban connection may be utilized for management and control purposes while the in-band connection may be utilized to provide computer implemented services. These connections may be associated with different network endpoints thereby enabling communications to be selectively directed toward applications hosted by the processors (106) and/or system control processors (114). As will be discussed in greater detail with respect to FIG. 3, the system control processors (114) may utilize the out-of-band connections to communicate with other devices to manage (e.g., instantiate, monitor, modify, etc.) composed information handling systems.

The network (130) may correspond to any type of network and may be operatively connected to the Internet or other networks thereby enabling the information handling system (100) to communicate with any number and type of other devices.

The information handling system (100) may be implemented using computing devices. The computing devices may be, for example, a server, laptop computer, desktop computer, node of a distributed system, etc. The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the information handling system (100) described in this application and/or all, or a portion, of the methods illustrated in FIGS. 5.1-5.3. The information handling system (100) may be implemented using other types of computing devices without departing from the invention. For additional details regarding computing devices, refer to FIG. 7.

While the information handling system (100) has been illustrated and described as including a limited number of specific components, an information handling system in accordance with embodiments of the invention may include additional, fewer, and/or different components without departing from the invention.

Turning to FIG. 2, FIG. 2 shows a diagram of the hardware resources (118) in accordance with one or more embodiments of the invention. As noted above, system control processors of information handling system may present resources including, for example, any portion of the hardware resources (118) to form a composed information handling system.

The hardware resources (118) may include any number and types of hardware devices that may provide any quantity and type of computing resources. For example, the hardware resources (118) may include storage devices (200), memory devices (202), and special purpose devices (204).

The storage devices (200) may provide storage resources (e.g., persistent storage) in which applications hosted by a composed information handling system may store data including any type and quantity of information. The system control processors or other entities may write data chunks to the storage devices (200). The storage devices (200) may include any type and quantity of devices for storing data. The devices may include, for example, hard disk drives, solid state drives, tape drives, etc. The storage devices (200) may include other types of devices for providing storages resources without departing from the invention. For example, the storage devices (200) may include controllers (e.g., redundant array of disk controllers), load balancers, and/or other types of devices.

The memory devices (202) may provide memory resources (e.g., transitory and/or persistent storage) in which a composed information handling system may store data including any type and quantity of information. The memory devices (202) may include any type and quantity of devices for storing data. The devices may include, for example, transitory memory such as random access memory, persistent memory such as enterprise class memory, etc. The memory devices (202) may include other types of devices for providing memory resources without departing from the invention. For example, the storage devices (200) may include controllers (e.g., replication managers), load balancers, and/or other types of devices.

The special purpose devices (204) may provide other types of computing resources (e.g., graphics processing resources, computation acceleration resources, etc.) to composed information handling systems. The special purpose devices (204) may include any type and quantity of devices for providing other types of computing resources. The special purpose devices (204) may include, for example, graphics processing units for providing graphics processing resources, compute accelerators for accelerating corresponding workloads performed by composed information handling systems, application specific integrated circuits (ASICs) for performing other functionalities, digital signal processors for facilitating high speed communications, etc. The special purpose devices (204) may include other types of devices for providing other types of computing resources without departing from the invention.

The system control processors of the information handling systems may mediate presentation of the computing resources provided by the hardware resources (118) to computing resource sets (e.g., as bare metal resources to processors). When doing so, the system control processors may provide a layer of abstraction that enables the hardware resources (118) to be, for example, virtualized, emulated as being compatible with other systems, and/or directly connected to the compute resource sets (e.g., pass through). Consequently, the computing resources of the hardware resources (118) may be finely, or at a macro level, allocated to different composed information handling systems.

Additionally, the system control processors may manage operation of these hardware devices in accordance with one or more models, telemetry models. The models may include other models such as, for example, predictive analytics models, security models, workload performance availability models, reporting models, etc. The telemetry models may include generating, obtaining, and/or maintaining telemetry data for composed information handling systems. For additional information regarding the performance of telemetry services, refer to FIGS. 5.2-5.3.

The manner of operation of these devices (i.e., the performance of the aforementioned telemetry services) may be transparent to users utilizing the hardware devices for providing computer implemented services. Consequently, even though and users may be unaware of the implementation of these models, the composed information handling systems may still operate in accordance with these models thereby providing a reliable, efficient, and secure method of performing the telemetry services for composed information handling systems.

While the hardware resources (118) have been illustrated and described as including a limited number of specific components, hardware resources (118) in accordance with embodiments of the invention may include additional, fewer, and/or different components without departing from the invention.

As discussed above, information handling systems may include system control processors that may be used to instantiate composed information handling systems. FIG. 3 shows a diagram of a system control processor (298) in accordance with one or more embodiments of the invention. Any of the system control processors included in control resources sets of FIG. 1.2 may be similar to the system control processor (298) illustrated in FIG. 3.

The system control processor (298) may facilitate instantiation and operation of composed information handling systems. By doing so, a system that includes information handling systems may dynamically instantiate composed information handling systems to provide computer implemented services and to provide local telemetry services for the composed information handling system.

To instantiate and operate composed information handling systems, the system control processor (298) may include a composition manager (300), a physical resources manager (302), an emulated resources manager (304), a virtual resources manager (306), an telemetry collection manager (320), an system control processor manager (308), hardware resource services (310), and storage (312). Each of these components of the system control processor is discussed below.

The composition manager (300) may manage the process of instantiating and operating composed information handling systems. To provide these management services, the composition manager (300) may include functionality to (i) obtain information regarding the hardware components of the information handling system (e.g., obtain telemetry data regarding the information handling system), (ii) provide the obtained information to other entities (e.g., management entities such as system control processor manager (50, FIG. 1.1)), (iii) obtain composition requests for composed information handling systems, (iv) based on the composition requests, prepare and present resources as bare metal resources to compute resource sets, (v) instantiate applications in composed information handling systems to cause the composed information handling systems to provide computer implemented services, conform their operation to security models, etc., (vi) add/remove/modify resources presented to the compute resource sets of composed information handling systems dynamically in accordance with workloads being performed by the composed information handling systems, and/or (vii) coordinate with other system control processors to provide distributed system functionalities. By providing the above functionalities, a system control processor in accordance with one or more embodiments of the invention may enable distributed resources from any number of information handling systems to be aggregated into a composed information handling system to provide computer implemented services.

To obtain information regarding the hardware components of the information handling system, the composition manager (300) may inventory the components of the information handling system hosting the system control processor. The inventory may include, for example, the type and model of each hardware component, versions of firmware or other code executing on the hardware components, and/or other information regarding hardware components of the information handling system that may be allocated to form composed information handling systems.

The composition manager (300) may obtain composition requests from other entities (e.g., management entities tasked with instantiating composed information handling systems) as pre-loaded instructions present in storage of the system control processor, and/or via other methods. The composition requests may specify, for example, the types and quantities of computing resources to be allocated to a composed information handling system.

In one or more embodiments of the invention, the composition requests specify the computing resource allocations using an intent based model. For example, rather than specifying specific hardware devices (or portions thereof) to be allocated to a particular compute resource set to obtain a composed information handling system, the resource requests may only specify that a composed information handling system is to be instantiated having predetermined characteristics, that a composed information handling system will perform certain workloads or execute certain applications, and/or that the composed information handling system be able to perform one or more predetermined functionalities. In such a scenario, the composition manager may decide how to instantiate the composed information handling system (e.g., which resources to allocate, how to allocate the resources (e.g., virtualization, emulation, redundant workload performance, data integrity models to employ, etc.), to which compute resource set(s) to present corresponding computing resources, etc.).

In one or more embodiments of the invention, the composition requests specify the computing resource allocations using an explicit model. For example, the composition requests may specify (i) the resources to be allocated, (ii) the manner of presentation of those resources (e.g., emulating a particular type of device using a virtualized resource vs. path through directly to a hardware component), and (iii) the compute resource set(s) to which each of the allocated resources are to be presented.

In addition to specifying resource allocations, the composition requests may also specify, for example, applications to be hosted by the composed information handling systems, security models to be employed by the composed information handling systems, communication models to be employed by the composed information handling systems, data protection services to be provided to the composed information handling systems, user/entity access credentials for use of the composed information handling systems, and/or other information usable to place the composed information handling systems into states in which the composed information handling systems provide desired computer implemented services.

To prepare and present resources to compute resource sets based on the composition requests, the system control processors may implement, for example, abstraction, indirection, virtualization, mapping, emulation, and/or other types of services that may be used to present any type of resources as a resource that is capable of bare metal utilization by compute resource sets. To provide these services, the composition manager (300) may invoke the functionality of the physical resources manager (302), the emulated resources manager (304), and/or the virtual resources manager (306).

Additionally, the system control processors may take into account an importance of completion of workloads when preparing and presenting resources. For example, some workloads that may be performed by various hardware devices may be critical (e.g., high availability workloads) to the computer implemented services to be provided by a composed information handling system. In such a scenario, the system control processor may over allocate resources (e.g., beyond that requested by a compute resource set) for performance of the workloads so that at least two instances of the workloads can be performed using duplicative resources. By doing so, it may be more likely that at least one of the workloads will be completed successfully. Consequently, the system control processor may provide the output of one of the workloads to compute resource sets of a composed information handling system.

When presenting the resources to the compute resource sets, the system control processor (298) may present the resources using an emulated data plane. For example, the system control processors (298) may receive bare metal communications (e.g., IO from the processors) and respond in a manner consistent with responses of corresponding bare metal devices (e.g., memory). When doing so, the system control processor (298) may translate the communications into actions. The actions may be provided to the hardware devices used by the system control processor (298) to present the bare metal resources to the compute resource set(s). In turn, the hardware devices may perform the actions which results in a composed information handling system providing desired computer implemented services.

In some scenarios, multiple system control processors may cooperate to present bare metal resources to a compute resource set. For example, a single information handling system may not include sufficient hardware devices to present a quantity and/or type of resources to a compute resource set as specified by a composition requests (e.g., present two storage devices to a compute resource set when a single information handling system only includes a single storage device). In this scenario, a second system control processor of a second information handling system operatively connected to the system control processor tasked with presenting the resources to a compute resource set may prepare one of its storage devices for presentation. Once prepared, the second system control processor may communicate with the system control processor to enable the system control processor to present the prepared storage device (i.e., the storage device in the information handling system) to the compute resource set. By doing so, resources from multiple information handling system may be aggregated to present a desired quantity of resources to compute resource set(s) to form a composed information handling system.

By forming composed information handling systems as discussed above, embodiments of the invention may provide a system that is able to effectively utilize distributed resources across a range of devices to provide computer implemented services.

The physical resources manager (302) may manage presentation of resources to compute resource sets. For example, the physical resources manager (302) may generate, for example, translation tables that specify actions to be performed in response to bare metal communications obtained from compute resource sets. The translation tables may be used to take action in response to communications from compute resource sets.

The physical resources manager (302) may generate the translation tables based on the components of the compute resource sets, allocations or other types of commands/communications obtained from the compute resource sets, and the resources of the information handling system allocated to service the compute resource set. For example, when a compute resource set is presented with a bare metal resource, it may go through a discovery process to prepare the bare metal resource for use. As the discovery process proceeds, the compute resource set may send commands/communications to the bare metal resource to, for example, discover its address range. The physical resources manager (302) may monitor this process, respond appropriately, and generate the translation table based on these command and the resources available to service these bare metal commands/communications.

For example, consider a scenario where a virtualized disk is allocated to service bare metal storage commands from a compute resource set. In such a scenario, the physical resources manager (302) may generate a translation table that translates physical write from the compute resource set to virtualized writes corresponding to the virtualized disk. Consequently, the virtualized disk may be used by the system control processor (298) to present bare metal resources to the compute resource set.

The emulated resources manager (304) may generate emulation tables that enable resources that would otherwise be incompatible with a compute resource set to be compatible with the compute resource set. Different types of hardware devices of a compute resource set may be compatible with different types of hardware devices. Consequently, resources allocated to provide bare metal resources may not necessarily be compatible with the hardware devices of a compute resource set. The emulated resources manager (304) may generate emulation tables that map bare metal communications obtained from a compute resource set to actions that are compatible with resources allocated to provide bare metal resources to the compute resource sets.

The virtual resources manager (306) may manage virtualized resources that may be allocated to provide bare metal resources to compute resource sets. For example, the virtual resources manager (306) may include hypervisor functionality to virtualized hardware resources and allocate portions of the virtualized resources for use in providing bare metal resources.

While the physical resources manager (302), emulated resources manager (304), and virtual resources manager (306) have been described as generating tables, these components of the system control processor may generate other types of data structures or utilize different management models to provide their respective functionalities without departing from the invention.

To provide the aforementioned local telemetry services, the system control processor (298) may include the telemetry collection manager (320). The telemetry collection manager (320) may include the functionality to perform all, or a portion, of the local telemetry services. The local telemetry services may include (i) instantiating data collectors to generate and/or obtain telemetry data, (ii) generating data collector information associated with the data collectors, (iii) storing and/or maintaining telemetry data (e.g., telemetry data (318)) obtained from the data collectors, (iv) obtaining requests for telemetry data to satisfy a telemetry intent from the system control processor manager (e.g., 50, FIG. 1.1), and (v) providing telemetry data to the system control processor manager (e.g., 50, FIG. 1.1) to satisfy telemetry intents. The local telemetry services may include other and/or additional services without departing from the invention. For additional information regarding the telemetry services, refer to FIGS. 5.2-5.3. Other components of the system control processor (298) (e.g., composition manager (300)) may perform all, or a portion, of the local telemetry services without departing from the invention.

The functionalities of the physical resources manager (302), emulated resources manager (304), virtual resources manager (306), and the telemetry collection manager (320) may be utilized in isolation and/or combination to provide bare metal resources to compute resource sets and to provide management services to the composed information handling system. By doing so, the system control processor (298) may address compatibility issues, sizing issues to match available resources to those that are to be allocated, and/or other issues to enable bare metal resources to be presented to compute resource sets.

When providing bare metal resources, the composition manager (300) may invoke the functionality of the physical resources manager (302), emulated resources manager (304), and virtual resources manager (306). Consequently, resources may be presented as bare metal resources via pass-through (i.e., forwarding IO from compute resource sets to hardware devices), bare metal resource addressing of virtualized resources, and/or as emulated resources compatible with the hardware components of the compute resource set.

The functionality of the physical resources manager (302), emulated resources manager (304), virtual resources manager (306), and the telemetry collection manager (320) may be invoked using any communication model including, for example, message passing, state sharing, memory sharing, etc.

The system control processor manager (308) may manage the general operation of the system control processor (298). For example, the system control processor manager (308) may operate as an operating system or other entity that manages the resources of the system control processor (298). The composition manager (300), physical resources manager (302), emulated resources manager (304), virtual resources manager (306), and the telemetry collection manager (320) and/or other entities hosted by the system control processor (298) may call or otherwise utilize the system control processor manager (308) to obtain appropriate resources (e.g., processing resources, memory resources, storage, communications, etc.) to provide their functionalities.

The hardware resource services (310) may facilitate use of the hardware components of any number of hardware resource sets (e.g., 110, FIG. 1.1). For example, the hardware resource services (310) may include driver functionality to appropriately communicate with the hardware devices of hardware resource sets. The hardware resource services (310) may be invoked by, for example, the system control processor manager (308).

When providing their functionalities, any of the aforementioned components of the system control processor (298) may perform all, or a portion, methods illustrated in FIGS. 5.1-5.3.

The system control processor (298) may be implemented using computing devices. The computing devices may be, for example, an embedded computing device such a system on a chip, a processing device operatively coupled to memory and storage, or another type of computing device. The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the system control processor (298) described in this application and/or all, or a portion, of the methods illustrated in FIGS. 5.1-5.3. The system control processor (298) may be implemented using other types of computing devices without departing from the invention. For additional details regarding computing devices, refer to FIG. 7.

In one or more embodiments of the invention, the system control processor (298) is implemented as an on-board device. For example, the system control processor (298) may be implemented using a chip including circuitry disposed on a circuit card. The circuit card may also host the compute resource sets and/or hardware resource sets managed by the system control processor (298).

In one or more embodiments of the invention, the composition manager (300), physical resources manager (302), emulated resources manager (304), virtual resources manager (306), telemetry collection manager (320), system control processor manager (308), and/or hardware resource services (310) are implemented using a hardware device including circuitry. The hardware device may be, for example, a digital signal processor, a field programmable gate array, or an application specific integrated circuit. The circuitry may be adapted to cause the hardware device to perform the functionality of the composition manager (300), physical resources manager (302), emulated resources manager (304), virtual resources manager (306), telemetry collection manager (320), system control processor manager (308), and/or hardware resource services (310). The composition manager (300), physical resources manager (302), emulated resources manager (304), virtual resources manager (306), telemetry collection manager (320), system control processor manager (308), and/or hardware resource services (310) may be implemented using other types of hardware devices without departing from the invention.

In one or more embodiments of the invention, the composition manager (300), physical resources manager (302), emulated resources manager (304), virtual resources manager (306), telemetry collection manager (320), system control processor manager (308), and/or hardware resource services (310) are implemented using a processor adapted to execute computing code stored on a persistent storage (e.g., as part of the system control processor (298) or operatively connected to the system control processor (298) thereby enabling processors of the system control processor (298) to obtain and execute the computing code) that when executed by the processor performs the functionality of the composition manager (300), physical resources manager (302), emulated resources manager (304), virtual resources manager (306), telemetry collection manager (320), system control processor manager (308), and/or hardware resource services (310). The processor may be a hardware processor including circuitry such as, for example, a central processing unit or a microcontroller. The processor may be other types of hardware devices for processing digital information without departing from the invention.

As used herein, an entity that is programmed to perform a function (e.g., step, action, etc.) refers to one or more hardware devices (e.g., processors, digital signal processors, field programmable gate arrays, application specific integrated circuits, etc.) that provide the function. The hardware devices may be programmed to do so by, for example, being able to execute computer instructions (e.g., computer code) that cause the hardware devices to provide the function. In another example, the hardware device may be programmed to do so by having circuitry that has been adapted (e.g., modified) to perform the function. An entity that is programmed to perform a function does not include computer instructions in isolation from any hardware devices. Computer instructions may be used to program a hardware device that, when programmed, provides the function.

In one or more embodiments disclosed herein, the storage (312) is implemented using physical devices that provide data storage services (e.g., storing data and providing copies of previously stored data). The devices that provide data storage services may include hardware devices and/or logical devices. For example, storage (312) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage (312) may include a memory device (e.g., a dual in line memory device) in which data is stored and from which copies of previously stored data are provided. In another example, storage (312) may include a persistent storage device (e.g., a solid-state disk drive) in which data is stored and from which copies of previously stored data is provided. In a still further example, storage (312) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (312) may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

The storage (312) may store data structures including, for example, composed information handling system data (314), a resource map (316) and telemetry data (318). Each of these data structures is discussed below.

The composed information handling system data (314) may be implemented using one or more data structures that includes information regarding composed information handling systems. For example, the composed information handling system data (314) may specify identifiers of composed information handling systems and resources that have been allocated to the composed information handling systems.

The composed information handling system data (314) may also include information regarding the operation of the composed information handling systems. The information may include, for example, workload performance data, resource utilization rates over time, and/or other information that may be utilized to manage the operation of the composed information handling systems.

The composed information handling system data (314) may further include information regarding management models employed by system control processors. For example, the composed information handling system data (314) may include information regarding duplicative data stored for data integrity purposes, redundantly performed workloads to meet high availability service requirements, encryption schemes utilized to prevent unauthorized access of data, etc.

The composed information handling system data (314) may be maintained by, for example, the composition manager (300). For example, the composition manager may add, remove, and/or modify information included in the composed information handling system data (314) to cause the information included in the composed information handling system data (314) to reflect the state of the composed information handling systems.

The data structures of the composed information handling system data (314) may be implemented using, for example, lists, tables, unstructured data, databases, etc. While illustrated in FIG. 3 as being stored locally, the composed information handling system data (314) may be stored remotely and may be distributed across any number of devices without departing from the invention.

The resource map (316) may be implemented using one or more data structures that include information regarding resources of the information handling system and/or other information handling systems. For example, the resource map (316) may specify the type and/or quantity of resources (e.g., hardware devices, virtualized devices, etc.) available for allocation and/or that are already allocated to composed information handling systems. The resource map (316) may be used to provide data to management entities such as system control processor managers.

The data structures of the resource map (316) may be implemented using, for example, lists, tables, unstructured data, databases, etc. While illustrated in FIG. 3 as being stored locally, the resource map (316) may be stored remotely and may be distributed across any number of devices without departing from the invention.

The resource map (316) may be maintained by, for example, the composition manager (300). For example, the composition manager (300) may add, remove, and/or modify information included in the resource map (316) to cause the information included in the resource map (316) to reflect the state of the information handling system and/or other information handling systems.

The telemetry data (318) may be implemented using one or more data structures that includes information generated and/or obtained by data collectors (not shown) during the performance of telemetry services. Data collectors may refer to applications, services, and/or devices that may include the functionality to generate and/or obtain telemetry data associated with composed information handling system components. Each data collector may be associated with one or more composed information handling system components. The data collectors may be implemented as computer instructions, which when executed by a system control processor (e.g., 298) or other processor of the composed information handling system, cause the system control processor or the other processor to provide the functionality of the data collectors described herein. The data collectors may include other and/or additional functionalities without departing from the invention.

The data collectors may generate and/or obtain telemetry data: (i) in response to a request from the system control processor (298) or the system control processor manager (e.g., 50, FIG. 1.1), periodically based on a telemetry schedule, and/or in real time. The telemetry data (318) may include, for example, performance metrics, log files, utilization information, and other and/or additional types of information associated with components of the composed information handling system without departing from the invention. Each telemetry data component (e.g., performance metric, log file, etc.) of the telemetry data (318) may be associated with a component identifier (e.g., hardware resource tag or compute resource tag associated with hardware resources, compute resources, workloads, services, etc.). The component identifier may specify which component of the composed information handling system the telemetry data component is associated. Each telemetry data component may further be associated with a data collector identifier (e.g., a unique combination of bits associated with a data collector) that may be used to identify the data collector that generated or obtained the telemetry data component. The component identifier and/or the data collector identifiers may be used to select telemetry data components of the telemetry data that satisfy telemetry intents.

The telemetry data (318) may be maintained in the storage (312) by the telemetry collection manager (320) of the system control processor (298). The telemetry collection manager (320) may obtain the telemetry data (318) from the data collectors, update telemetry data (318) stored in the storage (312), and remove telemetry data (318) from the storage (312), and/or provide copies of portions of telemetry data (318) to the system control processor manager (e.g., 50, FIG. 1.1) during the performance of local telemetry services associated with the composed information handling system. The telemetry collection manager (320) may store the telemetry data (318) in the storage (312). The system control processor (298) may provide the a portions (i.e., a portion of the telemetry data components) of the telemetry data (318) to the system control processor manager (50, FIG. 1.1) which may further provide the telemetry data components to users (e.g., system administrators, quality engineers, etc.) to for further processing and analysis. The telemetry data (318) may be used be used for other and/or additional purposes without departing from the invention.

The data structures of the telemetry data (318) may be implemented using, for example, lists, tables, unstructured data, databases, etc. While illustrated in FIG. 3 as being stored locally, the telemetry data (318) may be stored remotely and may be distributed across any number of devices without departing from the invention.

While illustrated in FIG. 3 as being stored locally on the storage (312) of the system control processor (298), the composed information handling system data (314), resource map (316), and the telemetry data (318) may be stored remotely and may be distributed across any number of devices including storage devices of the hardware resource set of the composed system without departing from the invention.

While the storage (312) has been illustrated and described as including a limited number and type of data, a storage in accordance with embodiments of the invention may store additional, less, and/or different data without departing from the invention.

While the system control processor (298) has been illustrated and described as including a limited number of specific components, a system control processor in accordance with embodiments of the invention may include additional, fewer, and/or different components without departing from the invention.

Figure 4:
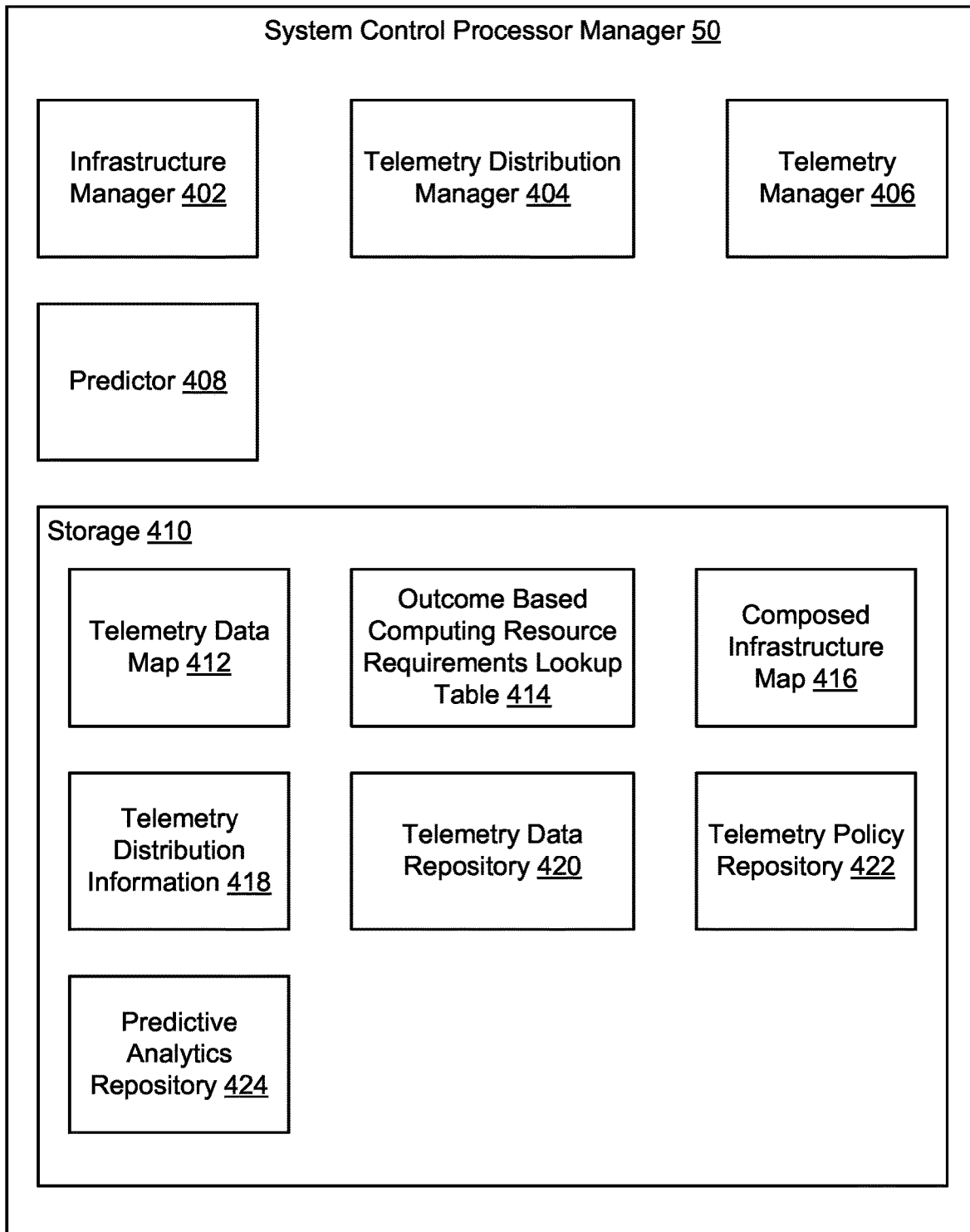
FIG. 4 shows a diagram of a system control processor manager in accordance with one or more embodiments of the invention.

As discussed above, a system control processor manager may cooperate with system control processors of control resource sets to instantiate composed information handling systems by presenting computing resources from hardware resource sets to processors of compute resource sets. FIG. 4 shows a diagram of the system control processor manager (50) in accordance with one or more embodiments of the invention.

The system control processor manager (50) may manage the process of instantiating composed information handling systems. To do so, the system control processor manager (50) may include an infrastructure manager (402), a telemetry distribution manager (404), a telemetry manager (406), and storage (410). Each of these components is discussed below.

The infrastructure manager (402) may provide composition services. Composition services may include obtaining composition requests for composed information handling systems, determining the resources to allocate to instantiate composed information handling systems, and cooperating with system control processors to allocate the identified resources. By doing so, the infrastructure manager (402) may cause any number of computer implemented services to be provided using the composed information handling systems.

To determine the resources to allocate to composed information handling systems, the infrastructure manager (402) may employ an intent based model that translates an intent expressed in a composition request to one more allocations of computing resources. For example, the infrastructure manager (402) may utilize an outcome based computing resource requirements lookup table (414) to match an expressed intent to resources to be allocated to satisfy that intent. The outcome based computing resource requirements lookup table (414) may specify the type a composed system blueprint, which may include the quantity, method of management, and/or other information regarding any number of computing resources that when aggregated will be able to satisfy a corresponding intent. The infrastructure manager (402) may identify resources for allocation to satisfy composition requests via other methods without departing from the invention.

To cooperate with the system control processors, the infrastructure manager (402) may obtain telemetry data regarding the computing resources of any number of information handling systems and/or external resources that are available for allocation. The infrastructure manager (402) may aggregate this data in a telemetry data repository (420) which may be subsequently used to identify resources of any number of information handling systems and/or external resources to satisfy composition requests (e.g., instantiate one or more composed information handling systems to meet the requirements of the composition requests).

When the infrastructure manager (402) identifies the computing resources to be allocated, the infrastructure manager (402) may communicate with any number of system control processors to implement the identified allocations. For example, the infrastructure manager (402) may notify a system control processor of a control resource set that portions of a hardware resource set are to be allocated to a compute resource set to instantiate a composed information handling system. The system control processor may then take action (e.g., prepare the portion of the hardware resource set for presentation to a processor of the compute resource set) in response to the notification.

As composed information handling systems are instantiated, the infrastructure manager (402) may add information reflecting the resources allocated to composed information handling systems, the workloads being performed by the composed information handling systems, user identifiers (e.g., a unique combination of bits associated with a particular user) associated with one or more users using the composed information handling systems, and/or other types of information to a composed infrastructure map (416). The infrastructure manager (402) may utilize this information to, for example, decide whether computing resources should be added to or removed from composed information handling system. Consequently, computing resources may be dynamically re-provisioned over time to meet changing workloads imposed on composed information handling systems.

The system control processor manager (50) may fail and/or otherwise lose the telemetry data map (412) and the composed infrastructure map (416) for any reason without departing from the invention. To continue to provide composition services, the system control processor manager (50) may restore the telemetry data map (412) and the composed infrastructure map (416) by performing a discovery to obtain telemetry data from system control processors and obtaining state information associated with the composed systems from one or more system control processors. The system control processor manager (50) may use the telemetry data and the state information to repopulate the telemetry data map (412) and the composed infrastructure map (416) and to determine whether any composed information handling systems need to be re-composed.

In one or more embodiments of the invention, the infrastructure manager (402) is implemented using a hardware device including circuitry. The hardware device may be, for example, a digital signal processor, a field programmable gate array, or an application specific integrated circuit. The circuitry may be adapted to cause the hardware device to perform the functionality of the infrastructure manager (402). The infrastructure manager (402) may be implemented using other types of hardware devices without departing from the invention.

In one or more embodiments of the invention, the infrastructure manager (402) is implemented using a processor adapted to execute computing code stored on a persistent storage that when executed by the processor performs the functionality of the infrastructure manager (402). The processor may be a hardware processor including circuitry such as, for example, a central processing unit or a microcontroller. The processor may be other types of hardware devices for processing digital information without departing from the invention.

When providing its functionality, the infrastructure manager (402) may perform all, or a portion, of the methods illustrated in FIG. 5.1.

The telemetry distribution manager (404) may include the functionality to setup telemetry services. Setting up telemetry services may include: (i) obtaining requests to instantiate composed information handling systems from users, (ii) determining whether composition requests are associated with existing groups or new groups, (iii) determining whether composition requests associated with existing groups are further associated with a change to the existing group, (iv) modifying telemetry distribution information (e.g., 418) based on changes to existing groups, (v) generating new telemetry distribution information for new groups, (vi) instructing system control processors (e.g., 298) to instantiate data collectors, and (vii) associated data collectors with telemetry distribution information (418) and a telemetry data map (412). Setting up telemetry services may include other and/or additional services without departing from the invention. The telemetry distribution manager (404) may include other and/or additional functionalities without departing from the invention.

The telemetry distribution manager (404) may maintain telemetry distribution information (418). The telemetry distribution information (418) may be one or more data structures that include group entries. Each group entry may include a group identifier, one or more user identifiers, a group encryption key, communication information associated with users, a composed information handling system identifier, and data collector information. The telemetry distribution information (418) may include other and/or additional information without departing from the invention. The telemetry distribution information (418) may be generated and maintained by the telemetry distribution manager (404) when setting up telemetry services or when group modification requests (discussed below) are obtained. The telemetry distribution information (418) may be used by the telemetry manager (406) when performing telemetry services.

The group identifier may be a unique combination of bits used to identify a specific group of users. The user identifiers may be unique combinations of bits used to identify specific groups of users. The communication information may be any appropriate information that may be used to enable the communication of instructions and/or data between the system control processor manager (50) and the users without departing from the invention. The group encryption key may be an encryption key generated and distributed to the users of the group periodically, when a new user is added to the group, or when a user is removed from the group. The group encryption key may be used by the telemetry manager (406) to encrypt aggregated telemetry data and by the user to decrypt the aggregated telemetry data. The composed information handling system identifier may be a unique combination of bits associated with composed information handling system and may be used to specify the composed information handling system. The data collector information may include data collector identifiers associated with the data collectors of the composed information handling system, component identifiers associated with the data collectors, and telemetry data types (e.g., performance metrics, log files, utilization measures, etc.).

The telemetry distribution manager (404), along with the telemetry manager (406), may also maintain a telemetry data map (412). The telemetry data map (412), in addition to the discussion below, may be one or more data structures that include telemetry data map entries. The telemetry map entries may be used to map components of composed information handling systems (e.g., graphs, subgraphs, etc.). The telemetry data map entries may also be used to tag and manager telemetry data associated with the composed information handling systems and the components of composed information handling systems. Each telemetry data map entry may include a transaction identifier associated with the composed information handling system, one or more hardware resource tags (discussed below) associated with at least one hardware resource sets, one or more compute resource tags associated with at least one compute resources sets, telemetry policies, and data collector information. The telemetry data map entries may include other and/or additional information without departing from the invention. The telemetry distribution manager (404) and/or the telemetry manager (406) may update telemetry maps when composed information handling systems are composed. The telemetry manager (406) may use the telemetry data map (412) to perform telemetry services.

In one or more embodiments of the invention, the infrastructure manager (402), the telemetry distribution manager (404) and/or the telemetry manager (406) may use and/or maintain a telemetry policy repository (422). The telemetry policy repository (422) may be one or more data structures that include composition intent entries. Each composition intent entry may include a composition intent identifier and one or more telemetry policies associated with the composition intent corresponding with the composition intent identifier. A telemetry policy may specify rules and/or requirements for performing telemetry services for composed information handling systems associated with the composition intent. The rules and/or requirements may include priorities associated with telemetry data (i.e., which telemetry data type is more critical to maintain), retention periods for telemetry data (how long may telemetry data be stored in storage before being deleted and/or archived to backup storage), and a telemetry schedule for collecting and/or providing telemetry data. The telemetry policies may include other and/or additional types of rules and/or requirements for performing telemetry services without departing from the invention. The telemetry policy repository (422) may be used by the telemetry distribution manager (404) when setting up telemetry services.

In one or more embodiments of the invention, the telemetry distribution manager (404) is implemented using a hardware device including circuitry. The hardware device may be, for example, a digital signal processor, a field programmable gate array, or an application specific integrated circuit. The circuitry may be adapted to cause the hardware device to perform the functionality of the telemetry distribution manager (404). The telemetry distribution manager (404) may be implemented using other types of hardware devices without departing from the invention.

In one or more embodiments of the invention, the telemetry distribution manager (404) is implemented using a processor adapted to execute computing code stored on a persistent storage that when executed by the processor performs the functionality of the telemetry distribution manager (404). The processor may be a hardware processor including circuitry such as, for example, a central processing unit or a microcontroller. The processor may be other types of hardware devices for processing digital information without departing from the invention.

When providing its functionality, the telemetry distribution manager (404) may perform all, or a portion, of the methods illustrated in FIGS. 5.1-5.2.

To perform telemetry services, the system control processor manager (50) may include a telemetry manager (406). Performing the telemetry services may include: (i) obtaining telemetry requests from users associated with groups, (ii) identifying a telemetry intent associated with the telemetry request, (iii) aggregate telemetry data obtained from system control processor and/or data collectors that satisfy the telemetry intent, (iv) encrypt the aggregated telemetry data using appropriate group encryption keys, and (v) providing the encrypted aggregated telemetry data the users of the group. The telemetry services may include other and/or additional services without departing from the invention. The telemetry manager (406) may include the functionality to perform, all or a portion of, the method of FIG. 5.3. The telemetry manager (406) may include other and/or additional functionalities without departing from the invention.

The telemetry manager (406) may further include the functionality to maintain a telemetry data repository (420). The telemetry data repository (420) may be one or more data structures that include composed information handling system entries. A composed information handling system entry may include a composed information handling system identifier, a transaction identifier, and telemetry data associated with the composed information handling system corresponding with the composed information handling system identifier obtained from system control processors and/or data collectors. The telemetry data may be an embodiment of the telemetry data (318) discussed above in FIG. 3. The telemetry data repository (420) may be updated by the telemetry manager (406) as telemetry services are performed for composed information handling systems. The telemetry data included in the telemetry data repository (420) may be the telemetry data necessary to satisfy telemetry intents during the performance of telemetry services. In other words, the telemetry data repository (420) may include telemetry data associated with an entire composed information handling system. The telemetry data repository (420) may be used by the telemetry manager (406) to perform telemetry services. The telemetry data repository (420) may include other and/or additional information and may be used for other and/or additional purposes without departing from the invention.

In one or more embodiments of the invention, the telemetry manager (406) is implemented using a hardware device including circuitry. The hardware device may be, for example, a digital signal processor, a field programmable gate array, or an application specific integrated circuit. The circuitry may be adapted to cause the hardware device to perform the functionality of the telemetry manager (406). The telemetry manager (406) may be implemented using other types of hardware devices without departing from the invention.

In one or more embodiments of the invention, the telemetry manager (406) is implemented using a processor adapted to execute computing code stored on a persistent storage that when executed by the processor performs the functionality of the telemetry manager (406). The processor may be a hardware processor including circuitry such as, for example, a central processing unit or a microcontroller. The processor may be other types of hardware devices for processing digital information without departing from the invention.

When providing its functionality, the telemetry manager (406) may perform all, or a portion, of the methods illustrated in FIGS. 5.3.

To perform the telemetry services, the system control processor manager (50) may include a predictor (408). The predictor (408) may include the functionality to generate predictive analytics using telemetry data. To generate predictive analytics, the predictor (408) may apply one or more predictive analytics models to telemetry data. The predictive analytics models may include any appropriate mathematical model that may generate predictive analytics using telemetry data without departing from the invention. The predictor (408) may further include the functionality to maintain a prediction analytics repository (424) (discussed below). The predictor (408) may include the functionality to perform all, or a portion of, the methods of FIGS. 5.1-5.3. The predictor may include other and/or additional functionalities without departing from the invention.

The predictive analytics repository (424) may be one or more data structures that include predictive analytics repository entries. Each predictive analytics repository entry may include a transaction identifier associated with a composed information handling system. Each predictive analytics repository entry may further include predictive analytics associated with the composed information handling system corresponding to the predictive analytics repository entry. Predictive analytics may include predicted future telemetry data. The predictive analytics may include, for example, predicted future performance metrics, predicted future log files, predicted future utilization information, and other and/or additional types of information associated with a future state of the components of the composed information handling system without departing from the invention. Each telemetry data component (e.g., performance metric, log file, etc.) of the telemetry data (318) may be associated with a component identifier (e.g., hardware resource tag or compute resource tag associated with hardware resources, compute resources, workloads, services, etc.). The predictive analytics may be used to optimize the instantiation of composed information handling systems. The predictive analytic repository (424) may include other and/or additional information and may be used for other and/or additional purposes without departing from the invention.

In one or more embodiments of the invention, the predictor (408) is implemented using a hardware device including circuitry. The hardware device may be, for example, a digital signal processor, a field programmable gate array, or an application specific integrated circuit. The circuitry may be adapted to cause the hardware device to perform the functionality of the predictor (408). The predictor (408) may be implemented using other types of hardware devices without departing from the invention.

In one or more embodiments of the invention, the predictor (408) is implemented using a processor adapted to execute computing code stored on a persistent storage that when executed by the processor performs the functionality of the predictor (408). The processor may be a hardware processor including circuitry such as, for example, a central processing unit or a microcontroller. The processor may be other types of hardware devices for processing digital information without departing from the invention.

In one or more embodiments disclosed herein, the storage (410) is implemented using physical devices that provide data storage services (e.g., storing data and providing copies of previously stored data). The devices that provide data storage services may include hardware devices and/or logical devices. For example, storage (410) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage (410) may include a memory device (e.g., a dual in line memory device) in which data is stored and from which copies of previously stored data are provided. In another example, storage (410) may include a persistent storage device (e.g., a solid-state disk drive) in which data is stored and from which copies of previously stored data is provided. In a still further example, storage (410) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (410) may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

The storage (410) may store data structures including, for example, the telemetry data map (412), outcome based computing resource requirements lookup table (414), the composed infrastructure map (416), the telemetry distribution information (418), the telemetry data repository (420), the telemetry policy repository (422), and a predictive analytics repository (424). These data structures may be maintained by, for example, the infrastructure manager (402), the telemetry distribution manager (404), the telemetry manager (406), and/or the predictor (408). For example, the infrastructure manager (402), the telemetry distribution manager (404), the telemetry manager (406), and/or the predictor (408) may add, remove, and/or modify information included in these data structures to cause the information included in these data structure to reflect the state of any number of information handling systems, external resources, and/or composed information handling systems and to perform telemetry services.

Any of these data structures may be implemented using, for example, lists, tables, unstructured data, databases, etc. While illustrated in FIG. 4 as being stored locally, any of these data structures may be stored remotely and may be distributed across any number of devices without departing from the invention.

While the storage (410) has been illustrated and described as including a limited number and type of data, a storage in accordance with embodiments of the invention may store additional, less, and/or different data without departing from the invention.

While the system control processor manager (50) has been illustrated and described as including a limited number of specific components, a system control processor manager in accordance with embodiments of the invention may include additional, fewer, and/or different components than those illustrated in FIG. 4 without departing from the invention.

As discussed above, the system of FIG. 1.1 may provide computer implemented services using composed information handling systems. FIGS. 5.1-5.3 show methods that may be performed by components of the system of FIG. 1.1 to compose and manage composed information handling systems.

Turning to FIG. 5.1, FIG. 5.1 shows a flowchart of a method in accordance with one or more embodiments of the invention. The method depicted in FIG. 5.1 may be performed to instantiate a composed information handling system in accordance with one or more embodiments of the invention. The method shown in FIG. 5.1 may be performed by, for example, a system control processor manager (e.g., 50, FIG. 1.1). Other components of the system in FIG. 1.1 may perform all, or a portion, of the method of FIG. 5.1 without departing from the invention.

While FIG. 5.1 is illustrated as a series of steps, any of the steps may be omitted, performed in a different order, additional steps may be included, and/or any or all of the steps may be performed in a parallel and/or partially overlapping manner without departing from the invention.

In step 500, a composition request for a composed information handling system is obtained. The composition request may be obtained using any method without departing from the invention. For example, the composition request may be obtained as part of a message from another entity operatively connected to a system control processor manager. In another example, the composition request may be locally stored in a storage of a system control processor manager.

The composition request may be a data structure specifying that the composed information handling system is to be instantiated. As discussed with respect to FIG. 3, the composition request may be specific (i.e., includes a listing of resources to be allocated to the composed information handling system) or intent based (i.e., a desired outcome without specifying the resources to be allocated). The composition request may include any type and quantity of information usable to determine how to instantiate a composed information handling system.

In one or more embodiments of the invention, the composition request includes a list of computing resources to be allocated to the composed information handling system. For example, the composition request may specify computing resources, memory resources, storage resources, graphics processing resources, compute acceleration resources, communications resources, etc. The list may include any type and quantity of computing resources. The list of computing resources may include computing resources to be used to provide data protection services.

In one or more embodiments of the invention, the composition request specifies how the computing resources are to be presented. For example, the composition request may specify virtualization, emulation, etc. for presenting the computing resources.

In one or more embodiments of the invention, the composition request specifies how the resources used to present the computing resources are to be managed (e.g., a management model such as data integrity, security, management, usability, performance, etc.). For example, the composition request may specify levels of redundancy for data storage, data integrity to be employed (e.g., redundant array of independent disks (RAID), error correction code (ECC), etc.), levels of security to be employed for resources (e.g., encryption), and/or other information that specifies how system control processors are to utilize resources for presentation of resources to composed information handling systems. The composition request may specify that telemetry services are to be provided to the computing resources of the composed information handling system. The data protection services may include performing deduplication and/or compression on data generated by applications executing in the composed information handling system. The methods employed by the system control processors, or a portion thereof, may be transparent to the composed information handling systems because the resources may be presented to the compute resource sets of the composed information handling systems as bare metal resources while the system control processors provide the management functionality.

In one or more embodiments of the invention, the composition request includes a list of applications to be hosted by the composed information handling system. The list may include any type and quantity of applications.

The composition request may also specify the identities of one or more system control processors hosted by other devices. In some scenarios, as noted above, resources from other information handling systems may be used to form a composed information handling system. The identifiers of the system control processors of these other information handling systems may be used to form operable connections between the system control processors. These connections may be used by the system control processors to present, as bare metal resources, computing resources from other information handling systems to compute resource set(s) of the composed information handling system.

In one or more embodiments of the invention, the composition request specifies a desired outcome. The desired outcome may be, for example, computer implemented services to be provided in response to the composition request, telemetry services are to be provided in response to the composition request, etc. In another example, the desired outcome may be a list of applications to be hosted in response to the composition request. In other words, the composition request may specify a desired outcome without specifying the resources that are to be used to satisfy the requests, the methods of managing the resources, models employed to provide for data protection/integrity/security/ etc. Such a composition request may be referred to as an intent based composition request.

In step 502, a composed system blueprint associated with the composition request is identified. As discussed above, the outcome based computing resource requirements lookup table (e.g., 414, FIG. 4) may include a list of composition intents. Each composition intent may be associated with a composed system blueprint. The system control processor manager may compare the composition intent included in the composition request with the composition intents included in the outcome based computing resource requirements lookup table. The system control processor manager may identify the composition intent included in the outcome based computing resources lookup table that matches the composition intent included in the composition request as the composition intent associated with the composition request. The system control processor manager may identify the composed system blueprint associated with the identified composition intent as the composed system blueprint. A composed system blueprint associated with the composition request may be identified via other and/or additional methods without departing from the invention.

In step 504, a determination is made as to whether there are predictive analytics associated with the composed system blueprint. In one or more embodiments of the invention, the system control processor manager determines whether there are predictive analytics associated with the composed system blueprint using the telemetry data map and the predictive analytics repository. The telemetry data map may include one or more telemetry data map entries for previously generated composed information handling systems that were generated using the composed system blueprint. Such telemetry data map entries may include the composed system blueprint identifier associated with the composed system blueprint. The system control processor manager may identify all telemetry data map entries that include the composed system blueprint identifier. The system control processor manager may identify the corresponding transaction identifier of each identified telemetry data map entry. The system control processor manager may compare the transaction identifier of each identified telemetry data map entry with the transaction identifier included in the predictive analytics repository entries.

In one or more embodiments of the invention, if the system control processor manager identifies a match between a transaction identifier included in predictive analytics entry to that of an identified telemetry data map entry, then the system control processor manager may determine that there are predictive analytics associated with the composed system blueprint. In one or more embodiments of the invention, if the system control processor manager does not identify a match between a transaction identifier included in any predictive analytics entry to that of all the identified telemetry data map entries, then the system control processor manager may determine that there are not predictive analytics associated with the composed system blueprint. The determination as whether there are predictive analytics associated with the composed system blueprint may be made via other and/or additional methods without departing from the invention.

In one or more embodiments of the invention, if it is determined that there are predictive analytics associated with the composed system blueprint, then the method proceeds to step 508. In one or more embodiments of the invention, if it is determined that there are not predictive analytics associated with the composed system blueprint, then the method proceeds to step 506.

In step 506, a composed infrastructure associated with the composed system blueprint capable of performing the composition intent is identified based on telemetry data. The system control processor manager may obtain telemetry data associated with the transaction identifiers included in the telemetry data entries identified above in step 504. The system control processor manager may check the obtained telemetry data of previously instantiated composed information handling systems to determine whether the past states and/or current state of previously instantiated composed information handling system indicate that the composed system blueprint requires alteration to satisfy the composition intent. In other words, the telemetry data may indicate one or more issues (e.g., SLOs not being met, resource utilization thresholds being reached or exceeded, etc.) that may result in a composed information handling system experiencing poor performances, errors and/or failures. If the telemetry data indicates that the composed system blueprint requires alteration to satisfy the composition request, then the system control processor manager may update the composed system blueprint (e.g., by scaling out and/or scaling up the resource requirements of the original composed system blueprint).

The system control processor manager may use the telemetry data to identify a composed infrastructure that includes the resources specified by the updated composed system blueprint that have the required capacity to instantiate the composed information handling system to perform the workflow. Due to the possibility of incompatibility with shared resources of information handling systems between multiple composed information handling systems, the system control processor manager may also use the telemetry data to ensure that the resources of the composed infrastructure that are executing workflows for other composed information handling systems are compatible with the composed infrastructure and the workflow of the composition request. The telemetry data may indicate any current and/or past incompatibility issues for previously instantiated composed information handling systems. An example of an incompatibility between resources may include a noisy neighbor (e.g., where another composed information handling system using a shared resources monopolizes the resources), resource competition, etc. The composed infrastructure may include at least one compute resource set, at least one hardware resource set, and at least one control resource set. The system control processor manager may replace the original composed system blueprint with the updated composed system blueprint.

If the telemetry data does not indicate that an alteration to the composed system blueprint is required, then the system control processor may use the original composed system blueprint to identify the composed infrastructure. The system control processor manager may use the telemetry data to identify a composed infrastructure that includes the resources specified by the original composed system blueprint that have the required capacity to instantiate the composed information handling system to perform the workflow. Due to the possibility of incompatibility with shared resources of information handling systems between multiple composed information handling systems, the system control processor manager may also use the telemetry data to ensure that the resources of the composed infrastructure that are executing workflows for other composed information handling systems are compatible with the composed infrastructure and the workflow of the composition request. The telemetry data may indicate any current and/or past incompatibility issues for previously instantiated composed information handling systems. An example of an incompatibility between resources may include a noisy neighbor (e.g., where another composed information handling system using a shared resources monopolizes the resources), resource competition, etc. The composed infrastructure may include at least one compute resource set, at least one hardware resource set, and at least one control resource set.

If no telemetry data exists that is associated with previously generated composed information handling systems instantiated using the composed system blueprint, then the system control processor manager may identify the composed infrastructure using the composed system blueprint without determining whether to alter it or if there are any potential incompatibility issues. The system control processor manager may use the telemetry data to identify a composed infrastructure that includes the resources specified by the original composed system blueprint that have the required capacity to instantiate the composed information handling system to perform the workflow. The composed infrastructure may include at least one compute resource set, at least one hardware resource set, and at least one control resource set.

The composed infrastructure associated with the composed system blueprint capable of performing the composition intent may be identified based on telemetry data via other and/or additional methods without departing from the invention. In one or more embodiments of the invention, the method may proceed to step 510 following step 506.

In step 508, a composed infrastructure associated with the composed system blueprint capable of performing the composition intent is identified based on telemetry data and predictive analytics. The system control processor manager may obtain telemetry data and predictive analytics associated with the transaction identifiers included in the telemetry data entries and the predictive analytics repository entries identified above in step 504. The system control processor manager may check the obtained telemetry data and predictive analytics of previously instantiated composed information handling systems generated using the composed system blueprint to determine whether the past states, current state, potential future states of previously instantiated composed information handling system indicate that the composed system blueprint requires alteration to satisfy the composition intent. In other words, the telemetry data may indicate one or more issues (e.g., SLOs not being met or may potentially not be met, resource utilization thresholds being reached or exceeded or potentially will be exceeded, etc.) that may result in the newly composed information handling system experiencing poor performances, errors and/or failures. If the telemetry data and/or predictive analytics indicates that the composed system blueprint requires alteration to satisfy the composition request, then the system control processor manager may update the composed system blueprint (e.g., by scaling out and/or scaling up the resource requirements of the original composed system blueprint).

The system control processor manager may use the telemetry data and/or predictive analytics to identify a composed infrastructure that includes the resources specified by the updated composed system blueprint that have the required current and/or potential future capacity to instantiate the composed information handling system to perform the workflow. Due to the possibility of incompatibility with shared resources of information handling systems between multiple composed information handling systems, the system control processor manager may also use the telemetry data to ensure that the resources of the composed infrastructure that are executing workflows for other composed information handling systems are and potentially will be compatible with the composed infrastructure and the workflow of the composition request. The telemetry data and predictive analytics may indicate any past, current and/or potential future incompatibility issues for previously instantiated composed information handling systems. An example of an incompatibility between resources may include a noisy neighbor (e.g., where another composed information handling system using a shared resources monopolizes the resources), resource competition, etc. The composed infrastructure may include at least one compute resource set, at least one hardware resource set, and at least one control resource set. The system control processor manager may replace the original composed system blueprint with the updated composed system blueprint.

If the telemetry data and the predictive analytics do not indicate that an alteration to the composed system blueprint is required, then the system control processor may use the original composed system blueprint to identify the composed infrastructure. The system control processor manager may use the telemetry data to identify a composed infrastructure that includes the resources specified by the original composed system blueprint that have the required capacity to instantiate the composed information handling system to perform the workflow. Due to the possibility of incompatibility with shared resources of information handling systems between multiple composed information handling systems, the system control processor manager may also use the telemetry data and predictive analytics to ensure that the resources of the composed infrastructure that are executing workflows for other composed information handling systems are and potentially will be compatible with the composed infrastructure and the workflow of the composition request. The telemetry data and predictive analytics may indicate any past, current and/or potential future incompatibility issues for previously instantiated composed information handling systems. An example of an incompatibility between resources may include a noisy neighbor (e.g., where another composed information handling system using a shared resources monopolizes the resources), resource competition, etc. The composed infrastructure may include at least one compute resource set, at least one hardware resource set, and at least one control resource set.

In step 510, telemetry services for the composed information handling system are setup using at least one control resource set to obtain logical hardware resources managed by the at least one control resource set. The system control processor manager may instruct the at least one control resource set to perform local telemetry services. To perform local telemetry services, the system control processor manager may instantiate a telemetry collection manager (e.g., 320, FIG. 3) on the at least one control resource set. The system control processor manager may generate and/or obtain instructions and a device image for instantiating a telemetry collection manager to perform telemetry services for the composed information handling system. The system control processor manager may encapsulate the instructions and device image in messages, and send the messages to one or more system control processors of the at least one control resource set of the composed information handling systems.

In response to receiving the message, the system control processors may implement the instructions thereby instantiating the telemetry collection manager using the device image. The telemetry collection manager may be instantiated on the composed information handling system using other methods (e.g., performing first-time installations, copying binaries to storage and beginning execution of the binaries, etc.) without departing from the invention.

Additional management services may also be set up. The additional management services may include, for example, virtualization, emulation, abstraction, indirection, duplicative writes, deduplication, compression, backup generation, and/or other type of services to meet the requirements of data integrity, security, and/or management models. The control resource set may provide at least a portion of the management services to the at least one hardware resource set identified in step 506. For additional information regarding setting up telemetry services for composed systems (i.e., also referred to as composed information handling systems herein), refer to FIG. 5.2.

In step 512, a composed information handling system is instantiated using the composed infrastructure to service the composition request. To instantiate the composed information handling system, the system control processor manager may instruct the system control processors of the at least one control resource set to make the bare metal resources of the composed infrastructure discoverable. For example, the at least one control resource set may send a bare metal communication to one or more processors of the at least one compute resource set to cause the processors to discover the presence of the presented bare metal resources. By doing so, the processors may then begin to utilize the logical hardware resources as bare metal resources resulting in a composed information handling system having all of the resources necessary to provide desired computer implemented services specified by the composition request.

The method may end following step 512.

Using the method illustrated in FIG. 5.1, a composed information handling system may be intelligently composed using a composed system blueprint, telemetry data, and predictive analytics associated with previously generated composed information handling systems.

Following step 512 of FIG. 5.1, no applications may be presently executing on the composed information handling system. The composed information handling systems may then be turned over to other entities for management (e.g., orchestrators, managers, and/or controllers) or may be additionally managed by the system control processor manager by instructing the system control processors to load applications onto the composed information handling systems using any method without departing from the invention. For example, device images (e.g., data structures including information that may be used to instantiate one or more applications in corresponding operating states) may be used to begin execution of appropriate applications in desired states. By doing so, the composed information handling systems may begin to provide desired computer implemented services. Applications may be instantiated on a composed information handling system using other methods (e.g., performing first-time installations, copying binaries to storage and beginning execution of the binaries, etc.) without departing from the invention.

Concurrently with or following the steps illustrated in FIG. 5.1, the composed information handling system data (314, FIG. 3) and resource map (316, FIG. 3) may be updated to reflect that various resources have now been allocated and are no longer available for allocation. For example, the resource map (316, FIG. 3) may be updated to indicate that the various hardware/virtualized devices being utilized to present bare metal resources to the composed information handling system are now allocated and unavailable (at least in part if virtualized) for allocation to present bare metal resources to other composed information handling systems. The telemetry data map (412, FIG. 4), the composed infrastructure map (416, FIG. 4), and the telemetry data repository (420, FIG. 4) maintained by the system control processor manager may be similarly updated.

Turning to FIG. 5.2, FIG. 5.2 shows a flowcharts of a method in accordance with one or more embodiments of the invention. The method of FIG. 5.2 may be performed to set up telemetry services in accordance with one or more embodiments of the invention. The method shown in FIG. 5.2 may be performed by, for example, a system control processor manager (e.g., 50, FIG. 1.1). Other components of the system in FIG. 1.1 may perform all, or a portion, of the methods of FIG. 5.2 without departing from the invention.

While FIG. 5.2 is illustrated as a series of steps, any of the steps may be omitted, performed in a different order, additional steps may be included, and/or any or all of the steps may be performed in a parallel and/or partially overlapping manner without departing from the invention.

In step 510, a transaction identifier associated with the composed information handling system is generated. A transaction identifier may be a unique combination of bits or characters (e.g., alphanumeric characters) that are associated with a composed information handling system. The transaction identifier may be of any size or length without departing from the invention. The system control processor manager may generate a random transaction identifier. Alternatively, the system control processor manager may generate the transaction identifier based on the composition request. As an example, the system control processor manager may use a transaction identifier provided by the user, generate a transaction identifier based on the composition request (e.g., based on the workflow), or may generate transaction identifiers sequentially (e.g., assign a numerical value where the current transaction identifier is a numerical value that is higher or lower than a previously generated transaction identifier). The system control processor manager may not generate a previously generated transaction identifier. The transaction identifier associated with the composed information handling system may be generated via other and/or additional methods without departing from the invention.

In step 512, hardware resource tags associated with the at least one hardware resource set are generated. A hardware resource tag may be a unique keyword, a unique combination of bits, and/or a unique combination of characters (e.g., alphanumeric characters associated with a hardware resource of the at least one hardware resource set. A hardware resource tag may be generated for each hardware resource of the at least one hardware resource. The hardware resource tags may include any size or length without departing from the invention. The hardware resource tags may be generated using any appropriate method of tag generation without departing from the invention. For example, the hardware resource tags may be generated randomly, sequentially, based on hardware resource types (e.g., one type storage device may be assigned a different type of hardware resource tag compared to another type of storage device), etc. Hardware resource tags associated with the at least one hardware resource set may be generated via other and/or additional methods without departing from the invention.

In step 514, compute resource tags associated with the at least one compute resource set are generated. A compute resource tag may be a unique keyword, a unique combination of bits, and/or a unique combination of characters (e.g., alphanumeric characters associated with a compute resource of the at least one compute resource set. A compute resource tag may be generated for each compute resource of the at least one compute resource. The compute resource tags may include any size or length without departing from the invention. The compute resource tags may be generated using any appropriate method of tag generation without departing from the invention. For example, the compute resource tags may be generated randomly, sequentially, based on compute resource types (e.g., CPUs may be assigned a different type of compute resource tag compared to GPUs), etc. Compute resource tags associated with the at least one compute resource set may be generated via other and/or additional methods without departing from the invention.

In step 516, telemetry policies associated with the composed information handling system are identified. As discussed above, the telemetry policy repository may include entries associated with each composition intent. Each interception and auditing intent entry may include one or more telemetry policies associated with the composition request. The system control processor manager may match the composition intent included in the composition request with a composition intent entry included in the telemetry policy repository. The system control processor manager may identify the one or more telemetry policies included in the corresponding composition intent entry as telemetry policies associated with the composed information handling system. Alternatively, or in combination with the above method for identifying telemetry policies associated with the composed information handling system, the user that submitted the composition request may include one or more telemetry policies in the composition request. The system control processor manager may parse the composition request and identify any telemetry intents included in the composition requests as telemetry policies associated with the composed information handling system. Telemetry policies associated with the composed information handling system may be identified via other and/or additional methods without departing from the invention.

In step 518, data collectors are instantiated to collect telemetry data. The system control processor manager may generate and/or obtain instructions and a device image for instantiating one or more data collectors to generate, obtain, and/or maintain telemetry data associated with the composed information handling system. The system control processor manager may encapsulate the instructions and device image in messages, and send the messages to one or more system control processors of the at least one control resource set of the composed information handling systems. In response to receiving the message, the system control processors may implement the instructions thereby instantiating the data collectors using the device image. Data collectors may be instantiated on the composed information handling system using other methods (e.g., performing first-time installations, copying binaries to storage and beginning execution of the binaries, etc.) without departing from the invention.

For composition requests associated with a re-composition of previously generated composed information handling systems, the system control processor manager may: (i) instantiate additional data collectors, (ii) remove previously instantiated data collectors, and/or (iii) modify the operation of previously instantiated data collectors. A re-composition may refer to adding, removing, and/or modifying components to/from/of a previously generated composed information handling system. The data collectors may be instantiated to perform a portion of the telemetry services to satisfy the one or more telemetry policies. Data collectors associated with the composed information handling system may be instantiated via other and/or additional methods without departing from the invention.

In step 520, a telemetry data map entry that associates the transaction identifier, the hardware resource tags, the compute resource tags, the telemetry policies, and the data collectors is generated. In one or more embodiments of the invention, the system control processor manager generates the telemetry data map entry by adding a new entry to the telemetry data map. The system control processor manager may include the transaction identifier, the hardware resource tags, the compute resource tags, the telemetry policies and data collector information associated with the data collectors of the composed information handling system. The system control processor manager may provide the transaction identifier to the user that submitted the composition request to enable the user to submit telemetry requests associated with the composed information handling system. As a result, the telemetry data map entry may be used to map the physical and logical components of the composed information handling system. The system control processor manager may generate mappings included in the telemetry data map entry using any appropriate method of associated physical and logical components of composed information handling system (e.g., graphs, subgraphs, etc.). The telemetry data map entry that associates the transaction identifier, the hardware resource tags, the compute resource tags, the telemetry policies, and the data collectors may be generated via other and/or additional methods without departing from the invention. The mappings included in the telemetry data map entry may be used to track, create, aggregate, perform complex queries of, analyze, store, and/or maintain telemetry data associated with the composed information handling system using the telemetry data map. The system control processor manager may also include the group identifier included in the composition request in the new group entry. If the composition request did not include a group identifier, then the system control processor may generate a new group identifier and include the new group identifier in the new group entry.

In Step 522, the performance of telemetry services based on the telemetry data map is initiated. The system control processor manager may send a message to one or more system control processor of the at least one control resource set of the composed information handling system. The message may include a request to perform the telemetry services. The message may further include a copy of the telemetry data map. In response to obtaining the message, the system control processors may begin to perform telemetry services for the composed information handling system. The system control processor may also instruct the data collector to begin generating and/or obtaining telemetry data. As telemetry data is generated and/or obtained, the data collectors and/or the system control processors may tag the telemetry data with the transaction identifier and the corresponding hardware resource tags and/or compute resource tags using the copy of the telemetry data map entry. As part of performing the telemetry services, the system control processors and/or the data collectors may also use the copy of the telemetry data map entry to track, create, aggregate, perform complex queries of, analyze, store, and/or maintain telemetry data associated with the composed information handling system. The system control processors and/or the data collectors may also provide telemetry data to the system control processor manager for further aggregation, analysis, maintenance, querying, etc. The performance of telemetry services based on the telemetry data map may be initiated via other and/or additional methods without departing from the invention.

In one or more embodiments of the invention, the method ends following step 522.

Using the method illustrated in FIG. 5.2, telemetry services may be set up for a composed information handling system. As a result, telemetry services for composed information handling systems may be provided for a composed information handling system based on a telemetry data map that may be used to maintain the physical to logical mappings of the composed information handling system. The telemetry data map may enable the system control processor manager, system control processors, and/or the data collectors to efficiently collect, track, analyze, aggregate, perform complex queries of, store and/or maintain telemetry data associated with each component of the composed information handling system for the entire lifecycle of the composed information handling system.

Turning to FIG. 5.3, FIG. 5.3 shows a flowcharts of a method in accordance with one or more embodiments of the invention. The method of FIG. 5.3 may be performed to perform telemetry services in accordance with one or more embodiments of the invention. The method shown in FIG. 5.3 may be performed by, for example, a system control processor manager (e.g., 50, FIG. 1.1). Other components of the system in FIG. 1.1 and FIG. 1.2 may perform all, or a portion, of the methods of FIG. 5.3 without departing from the invention.

While FIG. 5.3 is illustrated as a series of steps, any of the steps may be omitted, performed in a different order, additional steps may be included, and/or any or all of the steps may be performed in a parallel and/or partially overlapping manner without departing from the invention.

In step 530, a telemetry request associated with predictive analytics is obtained. The collection of the telemetry request may be identified as a telemetry collection event. The telemetry request may be obtained using any method without departing from the invention. For example, the telemetry request may be obtained as part of a message from another entity operatively connected to a system control processor manager (e.g., a client operated by a user). In another example, the telemetry request may be locally stored in a storage of a system control processor manager by a user.

The telemetry request may be a data structure (e.g., a manifest) specifying that one or more telemetry services is to be performed. The telemetry request may include a user identifier associated with the user that submitted the telemetry request, a group identifier associated with the group of users that includes the user for which may receive the telemetry data, and a transaction identifier associated with the composed information handling system for which the telemetry services are to be performed. The user identifiers may be used by the system control processor manager to identify the user that submitted the telemetry request. The telemetry request may further include a telemetry intent specifying the telemetry services to be performed. The telemetry intent may specify that telemetry data is to be used to generate predictive analytics. The telemetry request may include other and/or additional information usable to manage telemetry services for composed information handling systems without departing from the invention.

In step 532, a transaction identifier associated with the telemetry request is identified. As discussed above, the user that submitted the telemetry request may include the transaction identifier associated with the composed information handling system in the telemetry request. Consequently, the system control processor manager may parse the telemetry request to identify the transaction identifier. The transaction identifier associated with the telemetry request may be identified via other and/or additional methods without departing from the invention.

In step 534, a telemetry intent associated with the telemetry request is identified. As discussed above, the telemetry request may include a telemetry intent. The telemetry intent may specify a desired outcome associated with a portion of the composed information handling system without specifying particular actions to be taken and/or data to be collected. The portion of the composed information handling system specified by the telemetry intent may include, for example, one or more components of the composed information handling system, one or more workloads performed by the composed information handling system, one or more applications and/or services executing on the composed information handling systems, and/or additional portions of the composed information handling system without departing from the invention. The telemetry intent may further specify a telemetry schedule for specifying when to provide telemetry data to the user or group and one or more trigger events. Trigger events may refer to one or more events (e.g., exceeding of performance thresholds, component failures, etc.), that when such events occur, trigger the collection and transmission of telemetry data. The desired outcome may be, for example, provide telemetry data for all network devices, provide telemetry data collected in the past week of storage devices upon storage device failures, provide a performance update on an application executing on the composed information handling system, and/or other types of desired outcomes associated with telemetry without departing from the invention. In other words, the telemetry request may specify a desired outcome without specifying the resources that are to be used to satisfy the request and the methods for performing telemetry services to satisfy the desired outcomes to satisfy the desired outcome.

The system control processor manager may parse the telemetry request to identify the telemetry intent. The system control processor manager may include or otherwise have access to (e.g., stored in storage of the system control processor manager) a list of telemetry intents and may compare the telemetry intent included in the telemetry request with the list of telemetry intents to identify the telemetry intent associated with the telemetry request. The telemetry intent associated with the telemetry request may be identified via other and/or additional methods without departing from the invention.

In step 536, telemetry data is aggregated based on the telemetry intent and a telemetry data map entry associated with the transaction identifier to obtain aggregated telemetry data. As discussed above, the telemetry data map may include a telemetry data map entry associated with the composed information handling system targeted by the telemetry request. The system control processor manager may use the transaction identifier to identify the telemetry data map entry by comparing the transaction identifier included in the telemetry request with the transaction identifiers included in the telemetry data map. The system control processor manager may identify the telemetry data map entry with the transaction identifier that matches the transaction identifier included in the telemetry request as the telemetry data map entry associated with the transaction identifier. As discussed above, the telemetry intent may be associated with a portion of the composed information handling system.

The system control processor may use the telemetry data map entry to identify hardware resource tags and/or compute resource tags associated with the telemetry intent. The system control processor manager may obtain the telemetry data associated with the hardware resource tags and/or compute resource tags from the telemetry data repository or may request and obtain the telemetry data associated with the hardware resource tags and/or compute resource tags from the system control processors and/or data collectors of the composed information handling system. After obtaining all the telemetry data required to satisfy the telemetry intent, the system control processor manager may compose the telemetry data into a single collection of aggregated telemetry data. As a result, only the telemetry data required to satisfy the telemetry intent may be included in the aggregated telemetry data.

In step 538, predictive analytics are generated using the aggregated telemetry data. The system control processor manager may apply one or more predictive analytics models to the aggregated telemetry data to generate the predictive analytics. The predictive analytics models may include any appropriate mathematical models that may be used to generate predictions of future telemetry data values using the aggregated telemetry data without departing from the invention. The predictive analytics models may include, for example, time series forecasting models, neural networks, etc. The system control processor manager may tag the predictive analytics with the appropriate transaction identifier, hardware resource tags, and/or compute resource tags. Predictive analytics may be generated using the aggregated telemetry data via other and/or additional methods without departing from the invention.

In step 540, a determination is made as to whether the predictive analytics indicate a composed blueprint update is required. Following the generation of the predictive analytics, the system control processor manager may check the predictive analytics associated with the composed information handling systems predicted future telemetry data indicates that the composed system blueprint used to instantiate the composed information handling system requires alteration to satisfy the corresponding composition intent. In other words, the predictive analytics may indicate one or more predicted future issues (e.g., future SLOs not met, future resource utilization thresholds being exceeded, future resource neighbor incompatibility issues, etc.) that may result in the composed information handling system associated with the predictive analytics experiencing poor performances, errors and/or failures. In one or more embodiments of the invention, if the predictive analytics indicate that the composed system blueprint requires alteration to satisfy the composition request and perform the workflow, then the system control processor manager may determine that a composed system blueprint update is required. In one or more embodiments of the invention, if the predictive analytics do not indicate that the composed system blueprint requires alteration to satisfy the composition request and perform the workflow, then the system control processor manager may determine that a composed system blueprint update is not required. The determination as to whether a composed system blueprint update is required may be made via other and/or additional methods without departing from the invention.

In one or more embodiments of the invention, if it is determined that a composed system blueprint update is required, then the method proceeds to step 542. In one or more embodiments of the invention, if it is determined that a composed system blueprint update is not required, then the method proceeds to step 544.

In step 542, the composed system blueprint associated with the transaction identifier is updated based on the predictive analytics. In one or more embodiments of the invention, the telemetry data map entry includes the composed system blueprint identifier associated with the composed system blueprint used to instantiate the composed information handling system associated with the telemetry data map entry. The system control processor may use the composed system blueprint identifier to identify the composed system blueprint in the outcome based computing resource requirements lookup table. The system control processor manager may update the composed system blueprint by scaling up and/or scaling out the resource requirements specified by the composed system blueprint. Alternatively, the system control processor manager may notify a user (e.g., a system administrator) that the composed system blueprint requires an update. The system control processor manager may also provide the predictive analytics to the user. In response to receiving the notification, the user may update the composed system blueprint based on the predictive analytics. The composed system blueprint associated with the transaction identifier may be updated based on the predictive analytics via other and/or additional methods without departing from the invention.

In step 544, a determination is made as to whether the predictive analytics indicate a re-composition is required. Following the generation of the predictive analytics, the system control processor manager may check whether the predictive analytics associated with the composed information handling systems predicted future telemetry data indicates that the composed information handling system require re-composition to satisfy the corresponding composition intent. In other words, the predictive analytics may indicate one or more predicted future issues (e.g., future SLOs not met, future resource utilization thresholds being exceeded, future resource neighbor incompatibility issues, etc.) that may result in the composed information handling system experiencing future poor performances, future errors and/or future failures.

The system control processor may include or otherwise have access to a configurable future error and failure limit, which may specify a number of errors and/or failures of the composed information handling system and/or the components of the composed information handling system. In one or more embodiments of the invention, if the predictive analytics indicate a number of future errors and/or failures that is above the configurable future error and failure limit, then the system control processor manager may determine that a re-composition of the composed information handling system is required. In one or more embodiments of the invention, if the predictive analytics indicate a number of future errors and/or failures that is not above the configurable future error and failure limit, then the system control processor manager may determine that a re-composition of the composed information handling system is not required. The determination as to whether the predictive analytics indicate a re-composition is required may be made via other and/or additional methods without departing from the invention.

In step 546, a re-composition based on the predictive analytics is initiated. The system control processor manager may initiate the performance of the methods of FIGS. 5.1 and 5.2 to re-compose the composed information handling system to avoid the predicted future issues as indicated by the predictive analytics. The system control processor may generate a composition request associated with the composed information handling system. The predictive analytics will be taken into account during the re-composition of the composed information handling system. For additional information regarding instantiating composed information handling systems, refer to FIGS. 5.1-5.2. The re-composition based on the predictive analytics may be initiated via other and/or additional methods without departing from the invention.

In step 548, the predictive analytics repository may be updated based on the predictive analytics. If the composed information handling system is associated with a predictive analytics repository entry, then the system control processor manager may update the predictive analytics repository entry to include the predictive analytics. If the composed information handling system is not associated with a predictive analytics repository entry, then the system control processor manager may update the predictive analytics repository to include a new predictive analytics repository entry associated with the composed information handling system. The system control processor may include the transaction identifier associated with the composed information handling system and the predictive analytics in the new predictive analytics repository entry.

If the aggregated telemetry data and/or the predictive analytics are to be provided to the user that submitted the telemetry request to complete the services specified by the telemetry request, then the aggregated telemetry data and the predictive analytics may be provided to the user using any appropriate method of data transmission without departing from the invention. As an example, the aggregated telemetry data and predictive analytics may be sent as part of a message of packets across a network through one or more network devices that operatively connect the user to the system control processor manager.

In scenarios in which the user is part of a group, the system control processor manager may provide the aggregated telemetry data and predictive analytics to all users included in the group. As discussed above, the telemetry request may include the group identifier associated with the group of users that includes the user that submitted the telemetry request. The system control processor manager may identify the group entry of the telemetry distribution information associated with the group using the group identifier. The system control processor manager may identify the current group encryption key include in the group entry of the telemetry distribution information. The system control processor manager may encrypt the aggregated telemetry data and predictive analytics using the current group encryption key and any appropriate method of encryption without departing from the invention. The aggregated telemetry data and predictive analytics may be encrypted based on the telemetry distribution information associated with the group and the composed information handling system via other and/or additional methods without departing from the invention.

The system control processor manager may send the encrypted aggregated telemetry data and predictive analytics to each user in the group as a stream, broadcast, or multicast using any appropriate method of transmitting the aggregated telemetry data and predictive analytics once to multiple users. As a result, only users with the current group encryption key (i.e., users of the group) may decrypt the encrypted aggregated telemetry data and predictive analytics and use the aggregated telemetry data and predictive analytics for further processing and analysis (e.g., component failure predictions, health assessments, etc.). The encrypted aggregated telemetry data and predictive analytics may be provided to the group via other and/or additional methods without departing from the invention.

In one or more embodiments of the invention, the system control process manager may repeat steps 536 through 548 one or more times based on a schedule and/or trigger events specified by the telemetry request to satisfy the telemetry intent provided by the user.

In one or more embodiments of the invention, the method ends following step 548.

Using the method illustrated in FIG. 5.3, telemetry services may be performed by one or more system control processor managers for composed information handling systems. As a result, a user may submit a telemetry request with a telemetry intent associated with predictive analytics. In response to obtaining the telemetry intent, the system control processor manager may use a telemetry data map entry to collect and aggregate only the telemetry data of the composed information handling system. One or more predictive analytics models may be applied to the aggregated telemetry data to generate predictive analytics. The predictive analytics may be used to update composed system blueprints and re-compose composed information handling systems. Therefore, telemetry services for composed information handling systems may be efficiently performed to optimize the composition of composed information handling systems.

To further clarify embodiments of the invention, a non-limiting example is provided in FIGS. 6.1-6.3. FIGS. 6.1-6.3 show a system similar to that illustrated in FIG. 1.1. For the sake of brevity, only a limited number of components of the system of FIG. 1.1 are illustrated in FIGS. 6.1-6.3.

EXAMPLE

Consider a scenario as illustrated in FIG. 6.1 in which a system control processor manager (600) is providing composition services and telemetry services for two information handling systems (IHS), IHS A (610) and IHS B (630). IHS (610) includes compute resource set A (612), system control processor A (614), and solid state disk A (616). IHS B (630) includes compute resource set B (632), system control processor B (634), and solid state disk B (636).

At a first point in time, an employee of a company with five other employees submits, through a client of the clients (602), a composition request to instantiate a composed information handling system to host a database application and to provide telemetry services associated with predictive analytics. The composition request includes the user identifiers associated with all six employees of the company. The composition request may be submitted to the system control processor manager (600).

In response to obtaining the composition request, the system control processor manager (600) identifies the resources necessary to instantiate a composed information handling system to host the database application using a composed system blueprint associated with the intent. The system control processor manager (600) determines that there is no predictive analytics associated with previously generated composed information handling system for hosting a database application. In response to the determination, the system control processor manager (600) identifies a composed infrastructure using the composed system blueprint. The resources specified by the composed system blueprint include a compute resource set, a system control processor, and two terabytes of storage that can be presented as virtual storage devices. The system control processor manager (600) uses telemetry data associated with IHS A (610) to determine that IHS A (610) includes the necessary capacity to instantiate the composed system. The system control processor manager (600) also uses the telemetry data to confirm that no other composed information handling system is using the resources of IHS A (610) so there are currently no incompatibility issues. The system control processor manager then identifies that compute resource set A (612), system control processor A (614), and one terabyte of solid state disk A (616) of IHS A (610) are to be used to instantiate the composed information handling system.

Turning to FIG. 6.2, the system control processor manager (600) then instruct system control processor A (614) to instantiate the composed information handling system using the composed infrastructure as specified by the composed system blueprint. As a result, system control processor A (614) generates storage resource A (620) by virtualizing a first portion including one terabyte of solid state disk A (616) and storage resource B (622) by virtualizing second portion of solid state disk A (616) including one terabyte.

The system control processor manager (600) then generates a transaction identifier associated with the composed information handling system. After generating the transaction identifier, the system control processor manager (600) generates hardware resource tags. The system control processor manager generates one hardware resource tag associated with solid state disk A (616). The system control processor manager (600) may further generate hardware resource tags associated with storage resource A (620) and storage resource B (622). The system control processor manager (600) then associated the storage resource A (620) tag and the storage resource B (622) tag with the solid state disk A (616) tag. After generating the hardware resource tags, the system control processor manager (600) generates a compute resource tag associated with compute resource set A (612), which includes a CPU core and memory.

The system control processor manager (600) then identifies two telemetry policies associated with the composed information handling system. The first telemetry policy is associated with compute resource set A (612) and the other telemetry policy is associated with the solid state disk A (616). The system control processor manager next instructs system control processor A (614) to instantiate data collector A (624) to generate, obtain, and/or maintain telemetry data for compute resource set A (612), system control processor A (624), storage resource A (620), storage resource B (622), and solid state disk A (616) of IHS A (610).

The system control processor manager (600) then generates a telemetry data map entry that associates the transaction identifier, the hardware resource tags, the compute resource tag, the telemetry policies, and the data collector information associated with data collector A (624) of the composed information handling system. The system control processor manager (600) then initiates the performance of telemetry services using telemetry data map. The system control processor manager (600) then instructs system control processor A (614) to instantiate the database application on compute resource set A (612) and the composed information handling system begins providing database services for the user to service the composition request.

At some point in time after the composed information handling system was instantiated, the user desires to obtain predictive analytics for the composed information handling system associated with the storage devices. Therefore, the user submits, on behalf of the other employees of the company, a telemetry request to the system control processor manager (600) through a client of the clients (602). In response to obtaining the telemetry request, the system control processor manager (600) identifies that the transaction identifier associated with the telemetry request. After that, the system control processor identifies that the telemetry intent associated with the telemetry request is to provide an update of the health of the storage devices of the composed information handling system. The system control processor manager (600) uses the telemetry data map entry to identify the hardware resource tags included in the telemetry data map. As discussed above, the hardware resource tags include a solid state disk A (616) tag, a storage resource A (620) tag, and a storage resource B (622) tag. The system control processor then requests system control processor A (614) to provide all telemetry data associated with the hardware resource tags. System control processor A (614, 634) then obtains the requested telemetry data from data collector A (624) and provides the requested telemetry data to the system control processor manager (600).

After collecting the necessary telemetry data to satisfy the telemetry intent of the telemetry request using the hardware resource tags included in the telemetry data map, the system control processor manager (600) composes the telemetry data into a single collection of aggregated telemetry data that provides a comprehensive view of the health of the hardware resources of the composed information handling system. The system control processor manager (600) then applies a predictive analytics model to the aggregated data to obtain predictive analytics associated with the composed information handling system. In response to generating the predictive analytics, the system control processor manager (600) checks the predictive analytics. The predictive analytics indicate that the storage capacity of solid state disk assigned to the composed information will not be sufficient in the near future as a new composed information handling system is scheduled to be generated that will consuming a portion of the storage capacity of solid state disk A (614). The predictive analytics indicates that multiple I/O errors will occur after the new composed information handling system is instantiated. Based on the predictive analytics, the system control processor manager decides to perform a re-composition of the composed information handling system.

In response to determining to re-compose the composed information handling system, the system control processor identifies the resources necessary to instantiate a composed information handling system to host the database application using a composed system blueprint associated with the intent. The system control processor manager (600) determines that, based on the predictive analytics, the composed information handling system needs additional storage. In response to the determination, the system control processor manager (600) identifies a composed infrastructure using the composed system blueprint. The resources specified by the composed system blueprint include a compute resource set, two system control processors, and two terabytes of storage that can be presented as virtual storage devices. The system control processor manager (600) uses telemetry data associated with IHS A (610) to determine that both IHS A (610) and IHS B (630) include the necessary capacity to instantiate the composed system. The system control processor manager (600) also uses the telemetry data to confirm that the new composed information handling system is using the resources of IHS A (610) will not result in incompatibility issues. The system control processor manager then identifies compute resource set A (612), system control processor A (614), and one terabyte of solid state disk A (616) of IHS A (610), and system control processor B (634) and one terabyte of solid state disk B (636) of IHS B to be used to re-compose the composed information handling system.

Turning to FIG. 6.3, the system control processor manager (600) then instructs system control processor A (614) and system control processor B (634) to instantiate the composed information handling system using the identified resources. As a result, system control processor A (614) generates storage resource A (620) by virtualizing a first portion including half a terabyte of solid state disk A (616) and storage resource B (622) by virtualizing second portion of solid state disk A (616) including half terabyte. Similarly, system control processor B (634) generates storage resource C (640) by virtualizing a portion of solid state disk B (636) including half a terabyte and storage resource D (642) by virtualizing a portion of solid state disk B (636) including half a terabyte.

The system control processor manager (600) then identifies the telemetry data map entry associated with the transaction identifier of the re-composed information handling system. The system control processor manager (600) then generates one hardware resource tag associated with solid state disk A (616) and one hardware resource tag associated with solid state disk B (636). The system control processor manager (600) may further generate hardware resource tags associated with storage resource A (620), storage resource B (622), storage resource C (640), and storage resource D (642). The system control processor manager (600) then associated the storage resource A (620) tag and the storage resource B (622) tag with the solid state disk A (616) tag. Similarly, the system control processor manager (600) associates the solid state disk B (636) tag with the storage resource C (640) tag and the storage resource D (642) tag. After generating the hardware resource tags, the system control processor manager (600) generates a compute resource tag associated with compute resource set A (612) which includes a CPU core and memory.

The system control processor manager (600) then identifies two telemetry policies associated with the composed information handling system. The first telemetry policy is associated with compute resource set A (612) and the other telemetry policy is associated with the solid state disks (616, 636). The system control processor manager next instructs system control processor A (614) to instantiate data collector A (624) to generate, obtain, and/or maintain telemetry data for compute resource set A (612), system control processor A (624), storage resource A (620), storage resource B (622) and solid state disk A (616) of IHS A (610). The system control processor manager (600) also instructs system control processor B (634) to instantiate data collector B (644) to generate, obtain, and/or maintain telemetry data for system control processor B (634), storage resource C (640), storage resource D (642) and solid state disk B (636) of IHS B (630).

The system control processor manager (600) then generates a telemetry data map entry that associates the transaction identifier, the hardware resource tags, the compute resource tag, the telemetry policies, and the data collector information associated with the data collectors (624, 644) of the composed information handling system. The system control processor manager (600) then initiates the performance of telemetry services using telemetry data map. The system control processor manager (600) then instructs system control processor A (614) to instantiate the database application on compute resource set A (612) and the re-composed information handling system begins providing database services for the user to service the re-composition request.

After re-composing the composed information handling system, the necessary telemetry data and predictive analytics to satisfy the telemetry intent of the telemetry request, the system control processor manager (600) then provides the aggregated telemetry data and the predictive analytics to user for further processing and analysis.

END OF EXAMPLE

Thus, as illustrated in FIGS. 6.1-6.3, embodiments of the invention may provide a system that enables the optimization of compositions of composed information handling systems using telemetry data to generate predictive analytics.

Figure 7:
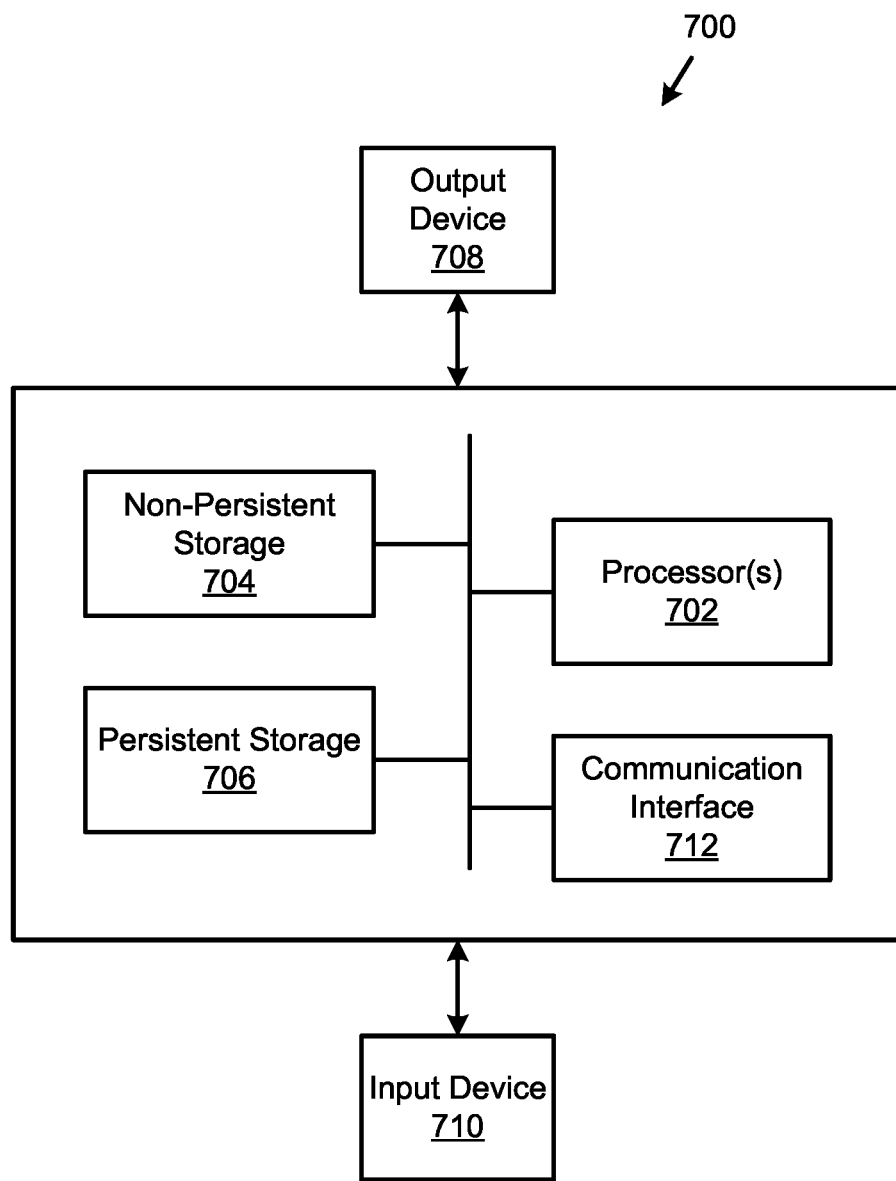
FIG. 7 shows a diagram of a computing device in accordance with one or more embodiments of the invention.

As discussed above, embodiments of the invention may be implemented using computing devices. FIG. 7 shows a diagram of a computing device in accordance with one or more embodiments of the invention. The computing device (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), input devices (710), output devices (708), and numerous other elements (not shown) and functionalities. Each of these components is described below.

In one embodiment of the invention, the computer processor(s) (702) may be an integrated circuit for processing instructions. For example, the computer processor(s) may be one or more cores or micro-cores of a processor. The computing device (700) may also include one or more input devices (710), such as a touchscreen, keyboard, mouse, microphone, touchpad, electronic pen, or any other type of input device. Further, the communication interface (712) may include an integrated circuit for connecting the computing device (700) to a network (not shown) (e.g., a local area network (LAN), a wide area network (WAN) such as the Internet, mobile network, or any other type of network) and/or to another device, such as another computing device.

In one embodiment of the invention, the computing device (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing devices exist, and the aforementioned input and output device(s) may take other forms.

Embodiments of the invention may provide a system and method for performing telemetry services for composed information handling systems. Specifically, embodiments of the invention may enable users associated with a group to submit composition requests associated with telemetry services, provide a system control processor manager that may compose an compose information handling system to with telemetry service using telemetry data and predictive analytics to optimize the composition of composed information handling system. As a result, a user of the composed information handling system may submit a telemetry request associated with predictive analytics to the system control processor manager. The system control processor manager may aggregate telemetry data from data collectors and/or system control processors of the composed information handling system to generate predictive analytics to satisfy the telemetry intent. Consequently, the telemetry data and the predictive analytics may be used to update composed system blueprints and improve the composition of future composed information handling systems as well as dynamically re-compose composed information handling systems based on future predicted issues using the predictive analytics.

Thus, embodiments of the invention may address the problem of the inefficient use of composed information handling systems to perform telemetry services. The composed information handling systems may leverage telemetry data maps to generate, track and maintain telemetry data that may be used to generate predictive analytics. Therefore, the telemetry data and the predictive analytics may enable the system control processor manager to optimize the composition of composed information handling systems based on past states, current states, and/or futures states of similar composed information handling systems.

The problems discussed above should be understood as being examples of problems solved by embodiments of the invention of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as of the invention. Accordingly, the scope of the invention should be limited only by the attached claims.

What is claimed is:

1. A method for managing composed information handling systems, comprising:
   obtaining, by a system control processor manager, a composition request for a composed information handling system to perform a workflow;
   in response to obtaining the composition request:
     identifying a composed system blueprint associated with the workflow;
     making a first determination that there are first predictive analytics associated with the composed system blueprint;
     in response to the first determination:
       identifying a composed infrastructure associated with the composed system blueprint capable of performing the workflow based on telemetry data and the first predictive analytics;
       servicing the composition request by instantiating a composed information handling system using the composed infrastructure; and
       setting up, after the instantiating, telemetry services for the composed information handling system using an at least one control resource set, wherein setting up the telemetry services for the composed information handling system comprises:
  generating a transaction identifier associated with the composed information handling system,
  generating hardware resource tags associated with at least one hardware resource set of the composed information handling system,
  generating compute resource tags associated with the least one compute resource set of the composed information handling system,
  instantiating data collectors associated with the composed information handling system,
  identifying telemetry policies associated with the composed information handling system,
  generating a telemetry data map entry that associates the transaction identifier, the hardware resource tags, the compute resource tags, the telemetry policies, and the data collectors, and
  initiating performance of telemetry services based on the telemetry data map entry; and
  determining whether to initiate re-composition of the composed information handling system based on second predictive analytics associated with the composed information handling system, wherein the second predictive analytics are generated using the telemetry services.

2. The method of claim 1, wherein the first predictive analytics specify potential future states of other composed information handling systems instantiated using the composed system blueprint.

3. The method of claim 2, wherein the telemetry data specifies current and past states of the other composed information handling systems.

4. The method of claim 1, wherein determining whether to initiating re-composition of the composed information handling system based on the second predictive analytics associated with the composed information handling system comprises:
  after instantiating the composed information handling system using the composed infrastructure to service the composition request:
    identifying, by a system control processor manager, a telemetry collection event;
    in response to obtaining the telemetry collection event:
      identifying a transaction identifier associated with the composed information handling system;
      identifying telemetry intent associated with the telemetry collection event;
      aggregating telemetry data based on the telemetry intent and a telemetry data map entry associated with the transaction identifier to obtain aggregated telemetry data;
      generating the second predictive analytics using the aggregated telemetry data;
      making a second determination that the second predictive analytics indicate a composed system blueprint update is required; and
      in response to the second determination:
        updating the composed system blueprint based on the second predictive analytics; and
        updating a predictive analytics repository using the second predictive analytics.

5. The method of claim 4, wherein the second predictive analytics specify a predicted future state associated with the composed information handling system.

6. The method of claim 4, wherein the telemetry intent is associated with a portion of the hardware resource tags.

7. The method of claim 6, wherein aggregating telemetry data based on the telemetry intent comprises identifying a portion of the telemetry data associated with the portion of the hardware resource tags.

8. The method of claim 7, wherein the aggregated telemetry data comprises the portion of the telemetry data.

9. A non-transitory computer readable medium comprising computer readable program code, which when executed by a computer processor enables the computer processor to perform a method for managing composed information handling systems, the method comprising:
  obtaining, by a system control processor manager, a composition request for a composed information handling system to perform a workflow;
  in response to obtaining the composition request:
    identifying a composed system blueprint associated with the workflow;
    making a first determination that there are first predictive analytics associated with the composed system blueprint;
    in response to the first determination:
      identifying a composed infrastructure associated with the composed system blueprint capable of performing the workflow based on telemetry data and the first predictive analytics;
      servicing the composition request by instantiating a composed information handling system using the composed infrastructure; and
      setting up, after the instantiating, telemetry services for the composed information handling system using an at least one control resource set, wherein setting up the telemetry services for the composed information handling system comprises:
        generating a transaction identifier associated with the composed information handling system,
        generating hardware resource tags associated with at least one hardware resource set of the composed information handling system,
        generating compute resource tags associated with the least one compute resource set of the composed information handling system,
        instantiating data collectors associated with the composed information handling system,
        identifying telemetry policies associated with the composed information handling system,
        generating a telemetry data map entry that associates the transaction identifier, the hardware resource tags, the compute resource tags, the telemetry policies, and the data collectors, and
        initiating performance of telemetry services based on the telemetry data map entry; and
      determining whether to initiate re-composition of the composed information handling system based on second predictive analytics associated with the composed information handling system, wherein the second predictive analytics are generated using the telemetry services.

10. The non-transitory computer readable medium of claim 9, wherein the first predictive analytics specify potential future states of other composed information handling systems instantiated using the composed system blueprint.

11. The non-transitory computer readable medium of claim 10, wherein the telemetry data specifies current and past states of the other composed information handling systems.

12. The non-transitory computer readable medium of claim 9, wherein determining whether to initiating re-composition of the composed information handling system based on the second predictive analytics associated with the composed information handling system comprises:
after instantiating the composed information handling system using the composed infrastructure to service the composition request:
identifying, by a system control processor manager, a telemetry collection event;
in response to obtaining the telemetry collection event:
identifying a transaction identifier associated with the composed information handling system;
identifying telemetry intent associated with the telemetry collection event;
aggregating telemetry data based on the telemetry intent and a telemetry data map entry associated with the transaction identifier to obtain aggregated telemetry data;
generating the second predictive analytics using the aggregated telemetry data;
making a second determination that the second predictive analytics indicate a composed system blueprint update is required; and
in response to the second determination:
updating the composed system blueprint based on the second predictive analytics; and
updating a predictive analytics repository using the second predictive analytics.

13. The non-transitory computer readable medium of claim 12, wherein the second predictive analytics specify a predicted future state associated with the composed information handling system.

14. The non-transitory computer readable medium of claim 12, wherein the telemetry intent is associated with a portion of the hardware resource tags.

15. The non-transitory computer readable medium of claim 14, wherein aggregating telemetry data based on the telemetry intent comprises identifying a portion of the telemetry data associated with the portion of the hardware resource tags.

16. The non-transitory computer readable medium of claim 15, wherein the aggregated telemetry data comprises the portion of the telemetry data.

17. A system for managing composed information handling systems, comprising:
a plurality of information handling systems, wherein the plurality of information handling systems comprise a plurality of system control processors; and
a system control processor manager, comprising a processor and memory, programmed to:
obtain a composition request for a composed information handling system to perform a workflow;
in response to obtaining the composition request:
identify a composed system blueprint associated with the workflow;
make a first determination that there are first predictive analytics associated with the composed system blueprint;
in response to the first determination:
identify a composed infrastructure associated with the composed system blueprint capable of performing the workflow based on telemetry data and the first predictive analytics;
service the composition request by instantiating a composed information handling system using the composed infrastructure; and
set up telemetry services for the composed information handling system using an at least one control resource set, wherein setting up the telemetry services for the composed information handling system comprises:
generating a transaction identifier associated with the composed information handling system,
generating hardware resource tags associated with at least one hardware resource set of the composed information handling system,
generating compute resource tags associated with the least one compute resource set of the composed information handling system,
instantiating data collectors associated with the composed information handling system,
identifying telemetry policies associated with the composed information handling system,
generating a telemetry data map entry that associates the transaction identifier, the hardware resource tags, the compute resource tags, the telemetry policies, and the data collectors, and
initiating performance of telemetry services based on the telemetry data map entry; and
determining whether to initiate re-composition of the composed information handling system based on second predictive analytics associated with the composed information handling system, wherein the second predictive analytics are generated using the telemetry services.

18. The system of claim 17, wherein the first predictive analytics specify potential future states of other composed information handling systems instantiated using the composed system blueprint.

* * * * *